United States Patent
Totsuka

(10) Patent No.: US 10,867,411 B2
(45) Date of Patent: Dec. 15, 2020

(54) IMAGE PROCESSING APPARATUS AND IMAGE PROCESSING METHOD

(71) Applicant: CANON KABUSHIKI KAISHA, Tokyo (JP)

(72) Inventor: Atsushi Totsuka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 16/143,069

(22) Filed: Sep. 26, 2018

(65) Prior Publication Data

US 2019/0080479 A1 Mar. 14, 2019

Related U.S. Application Data

(63) Continuation of application No. PCT/JP2017/006142, filed on Feb. 20, 2017.

(30) Foreign Application Priority Data

Mar. 31, 2016 (JP) ................................ 2016-072600

(51) Int. Cl.
*G06T 7/00* (2017.01)
*G06T 7/90* (2017.01)
(Continued)

(52) U.S. Cl.
CPC ............... *G06T 7/90* (2017.01); *B41J 2/2117* (2013.01); *G06F 3/12* (2013.01); *G06K 9/3241* (2013.01);
(Continued)

(58) Field of Classification Search
CPC .... G06T 7/90; G06T 1/00; G06F 3/12; G06K 9/3241; H04N 1/46; H04N 1/54; H04N 1/60; H04N 1/3871
See application file for complete search history.

(56) References Cited

U.S. PATENT DOCUMENTS

2013/0201501 A1* 8/2013 Nishikawa ........... G03G 15/105
358/1.9
2013/0301065 A1* 11/2013 Nakatani ................ B41J 2/2114
358/1.9

(Continued)

FOREIGN PATENT DOCUMENTS

JP 2004181801 * 7/2004
JP 2004181801 A 7/2004

(Continued)

OTHER PUBLICATIONS

Petart Pjanic et al: "Color imaging and pattern hiding on a metallic substrate", ACM Transactions of Graphics, vol. 34, No. 4, Jul. 27, 2015 (Jul. 27, 2015, pp. 130:1-130:10, XP055308925, 2 Penn Plaza, Suite 701 New York NY 10121-0701 ISSN: 0730-0301, DOI: 10.1145/2766944 (Year: 2015).*

(Continued)

*Primary Examiner* — Ping Y Hsieh
(74) *Attorney, Agent, or Firm* — Canon U.S.A., Inc. IP Division

(57) ABSTRACT

An image processing apparatus that generates image data for generating an image by overlaying a second image upon a first image, includes first obtaining unit configured to obtain color information including a first color and a second color, second obtaining unit configured to obtain first image data indicating a first image, where a plurality of third regions, in which a first region and a second region are included coexisting, are laid out at a resolution sensed as being a single region, and first generating unit configured to generate second image data for generating the second image, where the first color is laid out in the first region and the second color is laid out in the second region.

13 Claims, 25 Drawing Sheets

(51) Int. Cl.

| | | |
|---|---|---|
| *G06F 3/12* | (2006.01) | |
| *H04N 1/60* | (2006.01) | |
| *H04N 1/54* | (2006.01) | |
| *B41J 2/21* | (2006.01) | |
| *H04N 1/46* | (2006.01) | |
| *G06T 1/00* | (2006.01) | |
| *G06K 9/32* | (2006.01) | |
| *H04N 1/387* | (2006.01) | |

(52) U.S. Cl.
CPC ................. *G06T 1/00* (2013.01); *H04N 1/46* (2013.01); *H04N 1/54* (2013.01); *H04N 1/60* (2013.01); *H04N 1/3871* (2013.01)

(56) References Cited

U.S. PATENT DOCUMENTS

2016/0086067 A1\* 3/2016 Shibasaki .......... G03G 15/6585 358/1.9
2016/0267365 A1\* 9/2016 Totsuka ................... H04N 1/54
2016/0286069 A1\* 9/2016 Kubo ....................... H04N 1/54

FOREIGN PATENT DOCUMENTS

| JP | 2009-12411 A | 1/2009 |
| JP | 2010-52225 A | 3/2010 |
| JP | 2010-186344 A | 8/2010 |
| JP | 2012-81638 A | 4/2012 |
| JP | 2012-85123 A | 4/2012 |

OTHER PUBLICATIONS

Petar Pjanic, et al., Color Changing Effects with Anisotropic Halftone Prints on Metal, ACM Transactions on Graphics, Nov. 2015, pp. 1-12, vol. 34, No. 6, Article 167.

Petar Pjanic, et al., Color Imaging and Pattern Hiding on a Metallic Substrate, ACM Transactions on Graphics, Aug. 2015, pp. 1-10, vol. 34, No. 4, Article 130.

\* cited by examiner

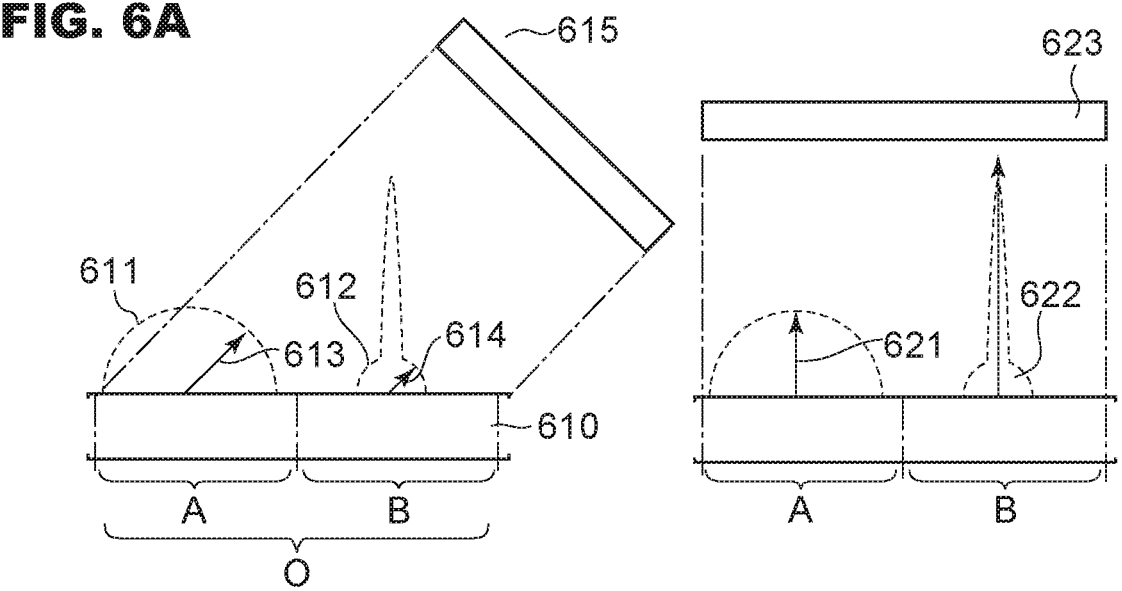
FIG. 6A
FIG. 6B
FIG. 6C
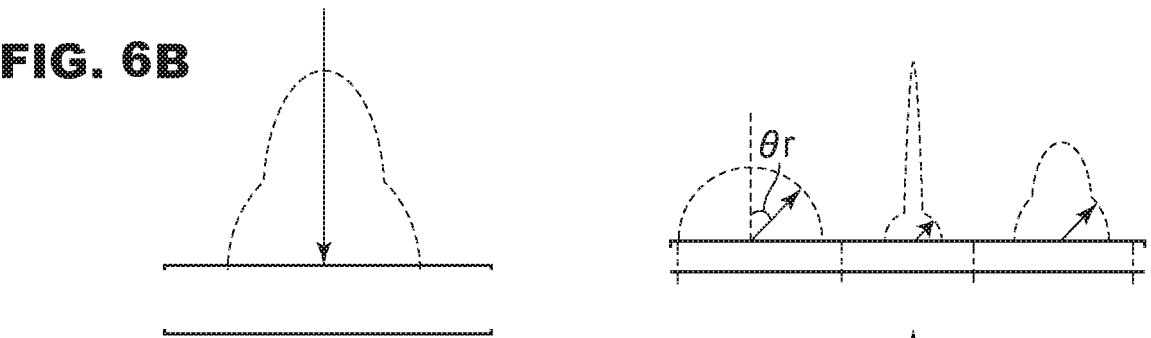
FIG. 6D
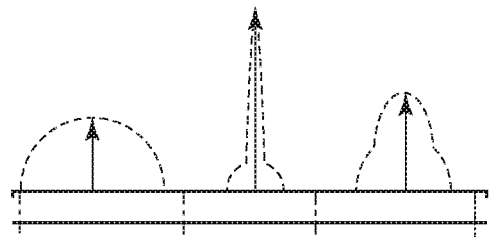
FIG. 6E
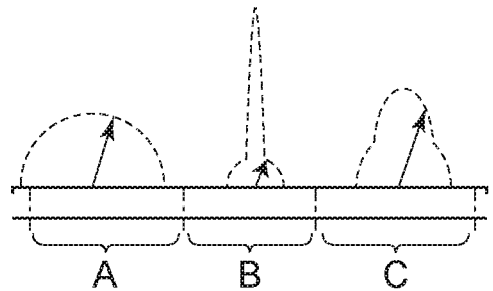

FIG. 10A

| GLOSS PROPERTIES | AMOUNT OF W INK |
|---|---|
| 0 | 100 |
| 1 | 0 |

FIG. 10B

| RGB VALUE | | | AMOUNT OF CMYK INK | | | |
|---|---|---|---|---|---|---|
| 0 | 0 | 0 | 93 | 88 | 89 | 80 |
| 0 | 0 | 32 | 99 | 99 | 72 | 65 |
| ⋮ | ⋮ | ⋮ | ⋮ | ⋮ | ⋮ | ⋮ |
| 0 | 32 | 0 | 92 | 72 | 99 | 66 |
| ⋮ | ⋮ | ⋮ | ⋮ | ⋮ | ⋮ | ⋮ |
| 255 | 255 | 224 | 3 | 0 | 18 | 0 |
| 255 | 255 | 255 | 0 | 0 | 0 | 0 |

FIG. 10C

| RGB VALUE | | | | | | AMOUNT OF CMYK INK | | | | | | | |
|---|---|---|---|---|---|---|---|---|---|---|---|---|---|
| RGB1 | | | RGB2 | | | CMYK1 | | | | CMYK2 | | | |
| 0 | 0 | 0 | 0 | 0 | 0 | 93 | 88 | 89 | 80 | 93 | 88 | 89 | 80 |
| 0 | 0 | 0 | 0 | 0 | 64 | 95 | 90 | 91 | 96 | 90 | 90 | 61 | 20 |
| ⋮ | ⋮ | ⋮ | ⋮ | ⋮ | ⋮ | ⋮ | ⋮ | ⋮ | ⋮ | ⋮ | ⋮ | ⋮ | ⋮ |
| 0 | 0 | 0 | 255 | 255 | 255 | 99 | 96 | 98 | 100 | 0 | 0 | 0 | 0 |
| 0 | 0 | 64 | 0 | 0 | 0 | 99 | 99 | 65 | 24 | 93 | 88 | 89 | 80 |
| ⋮ | ⋮ | ⋮ | ⋮ | ⋮ | ⋮ | ⋮ | ⋮ | ⋮ | ⋮ | ⋮ | ⋮ | ⋮ | ⋮ |
| 255 | 255 | 255 | 255 | 255 | 192 | 8 | 5 | 32 | 0 | 3 | 0 | 10 | 0 |
| 255 | 255 | 255 | 255 | 255 | 255 | 0 | 0 | 0 | 0 | 0 | 0 | 0 | 0 |

FIG. 19A

| RGB VALUE | | | AMOUNT OF INK | | | | | RECORDING ORDER |
|---|---|---|---|---|---|---|---|---|
| | | | C | M | Y | K | W | |
| 0 | 0 | 0 | 93 | 88 | 89 | 80 | 100 | 1 |
| 0 | 0 | 32 | 99 | 99 | 72 | 65 | 100 | 1 |
| : | : | : | : | : | : | : | 100 | 1 |
| 225 | 225 | 225 | 0 | 0 | 0 | 0 | 100 | 1 |

FIG. 19B

| RGB VALUE | | | AMOUNT OF INK | | | | | RECORDING ORDER |
|---|---|---|---|---|---|---|---|---|
| | | | C | M | Y | K | W | |
| 0 | 0 | 0 | 93 | 88 | 89 | 80 | 0 | 1 |
| 0 | 0 | 32 | 99 | 99 | 72 | 65 | 0 | 1 |
| : | : | : | : | : | : | : | 0 | 1 |
| 225 | 225 | 225 | 0 | 0 | 0 | 0 | 0 | 1 |

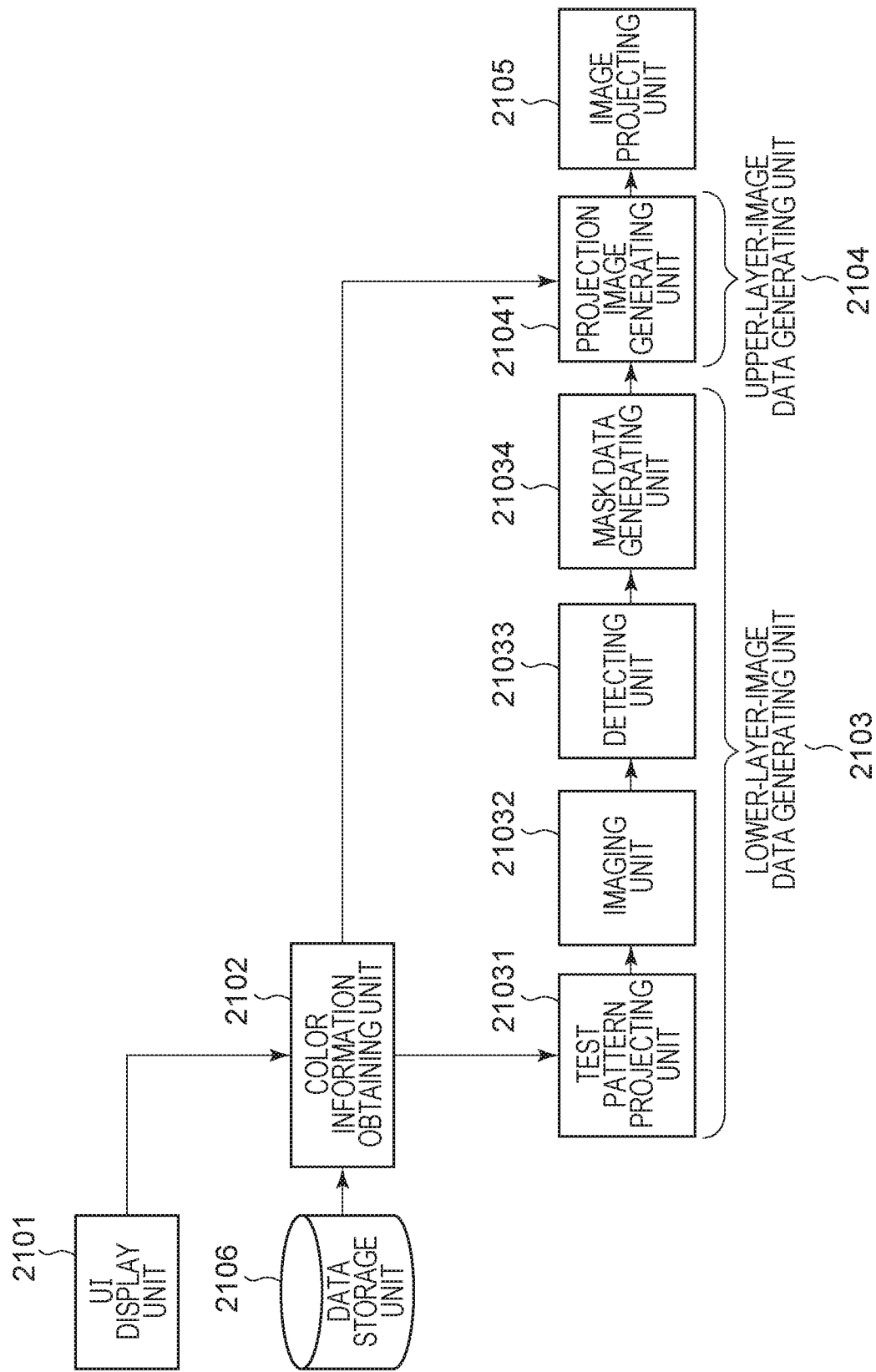

FIG. 25

| NO. | dpi | PATTERN DETERMINATION | | | CHANGE IN COLOR | | |
|---|---|---|---|---|---|---|---|
| | | ○ | △ | × | ○ | △ | × |
| 1 | 360 | 100% | 0% | 0% | 100% | 0% | 0% |
| 2 | 180 | 100% | 0% | 0% | 100% | 0% | 0% |
| 3 | 120 | 100% | 0% | 0% | 100% | 0% | 0% |
| 4 | 90 | 100% | 0% | 0% | 100% | 0% | 0% |
| 5 | 72 | 100% | 0% | 0% | 100% | 0% | 0% |
| 6 | 60 | 50% | 50% | 0% | 100% | 0% | 0% |
| 7 | 51 | 33% | 50% | 17% | 100% | 0% | 0% |
| 8 | 45 | 0% | 33% | 67% | 100% | 0% | 0% |
| 9 | 40 | 0% | 16% | 84% | 100% | 0% | 0% |
| 10 | 36 | 0% | 0% | 100% | 100% | 0% | 0% |
| 11 | 33 | 0% | 0% | 100% | 100% | 0% | 0% |
| 12 | 30 | 0% | 0% | 100% | 100% | 0% | 0% |

IMAGE PROCESSING APPARATUS AND IMAGE PROCESSING METHOD

CROSS-REFERENCE TO RELATED APPLICATIONS

This application is a Continuation of International Patent Application No. PCT/JP2017/006142, filed Feb. 20, 2017, which claims the benefit of Japanese Patent Application No. 2016-072600, filed Mar. 31, 2016, both of which are hereby incorporated by reference herein in their entirety.

TECHNICAL FIELD

The present invention relates to processing for controlling the color of diffuse reflected light and the color of specular reflected light on recording media.

BACKGROUND ART

Metal surfaces or metallic coated surfaces of gold, copper, and so forth, and Japanese jewel beetles and morpho butterflies that have structural color, have properties where coloration is strong in the specular direction of incident light. These properties are a factor in recognizing texture, such as the surface of a metal or so forth. In order to reproduce these properties, there is demand for printing technology where specular reflected light is controlled, in addition to disperse reflected light measured under geometric conditions such as 0/45 degrees or 45/0 degrees used in conventional color matching.

PTL 1 discloses technology using a color conversion table having different natures in regions where metallic texture is to be reproduced and regions where metallic texture is not to be reproduced. Specifically, a technology is disclosed where a small amount of dark ink is placed over a metallic ink in a region where metallic texture is to be reproduced, thereby realizing both metallic gloss and reproduction of color. PTL 2 discloses technology for controlling color of spectral reflected light using thin-film interference. Specifically, a transparent film is formed on the outmost surface by controlling the amount of clear ink being discharged, thereby enabling coloration of a particular color dependent on the thickness of the film, in the spectral reflection direction.

CITATION LIST

Patent Literature

PTL 1: Japanese Patent Laid-Open No. 2010-52225
PTL 2: Japanese Patent Laid-Open No. 2012-85123

However, PTL 1 does not take into consideration control of color of spectral reflected light. Also, the method using thin-film interference in PTL 2 requires the thickness of the film to be formed with high precision, in order to form the uniform clear ink film to an optional thickness. This film is greatly influenced by minute forms on the face where the clear ink lands, besides the amount of clear ink, so it is necessary to maintain the reproduction proprieties for each image to serve as a base layer for the film beforehand.

It is an object of the present invention to provide processing for easily imparting visual effects, where different colors are seen depending on the angle of viewing, to an image.

SUMMARY OF INVENTION

In order to solve the above problem, an image processing apparatus according to the present invention is an image processing apparatus that generates image data for generating an image by overlaying a second image upon a first image. The image processing apparatus includes first obtaining unit configured to obtain color information including a first color and a second color that differs from the first color, second obtaining unit configured to obtain first image data indicating a first image, where a plurality of third regions, in which a first region and a second region are included coexisting, are laid out at a resolution sensed as being a single region, and first generating unit configured to generate second image data for generating the second image, where the first color is laid out in the first region and the second color is laid out in the second region, based on the color information and the first image data. The second obtaining unit obtain the first image data, in which a proportion of reflection intensity of incident light at the first region and reflection intensity of incident light at the second region in one predetermined direction out of reflection directions of the incident light, and the proportion in one direction out of reflection directions of the incident light that is different from the predetermined one direction, are different proportions.

Further features of the present invention will become apparent from the following description of exemplary embodiments with reference to the attached drawings.

BRIEF DESCRIPTION OF DRAWINGS

FIGS. 6A through 6E are diagrams for describing color appearing at a spectral reflection direction and a non-spectral reflection direction at an image formed on a recording medium in an embodiment.

FIGS. 10A through 10C are diagrams illustrating an example of a LUT that is referenced in the first embodiment.

FIGS. 19A and 19B are diagrams illustrating an example of a LUT that is referenced in the sixth embodiment.

FIG. 21 is a block diagram illustrating the function configuration of the image projection system 20 according to the seventh embodiment.

FIG. 25 is a diagram illustrating results of subjective evaluation experimentation in the first embodiment.

DESCRIPTION OF EMBODIMENTS

Forms for carrying out the present invention will be described with reference to the drawings. Note, however, that the components described in these embodiments are only exemplary, and are not intended to restrict the scope of the present invention thereto.

First Embodiment

In the present embodiment, a printed product is formed where color visible at the non-specular reflection direction as to incident light to the image and color visible at the specular reflection direction as to incident light to the image are controlled, by controlling a printer provided with glossy ink and color ink as color materials, based on optional color information. Note that color as viewed at the non-specular reflection direction as to incident light will be referred to as diffuse reflected light hereinafter, and color as viewed at the specular reflection direction as to incident light will be referred to as specular reflected light.

Figure 1:
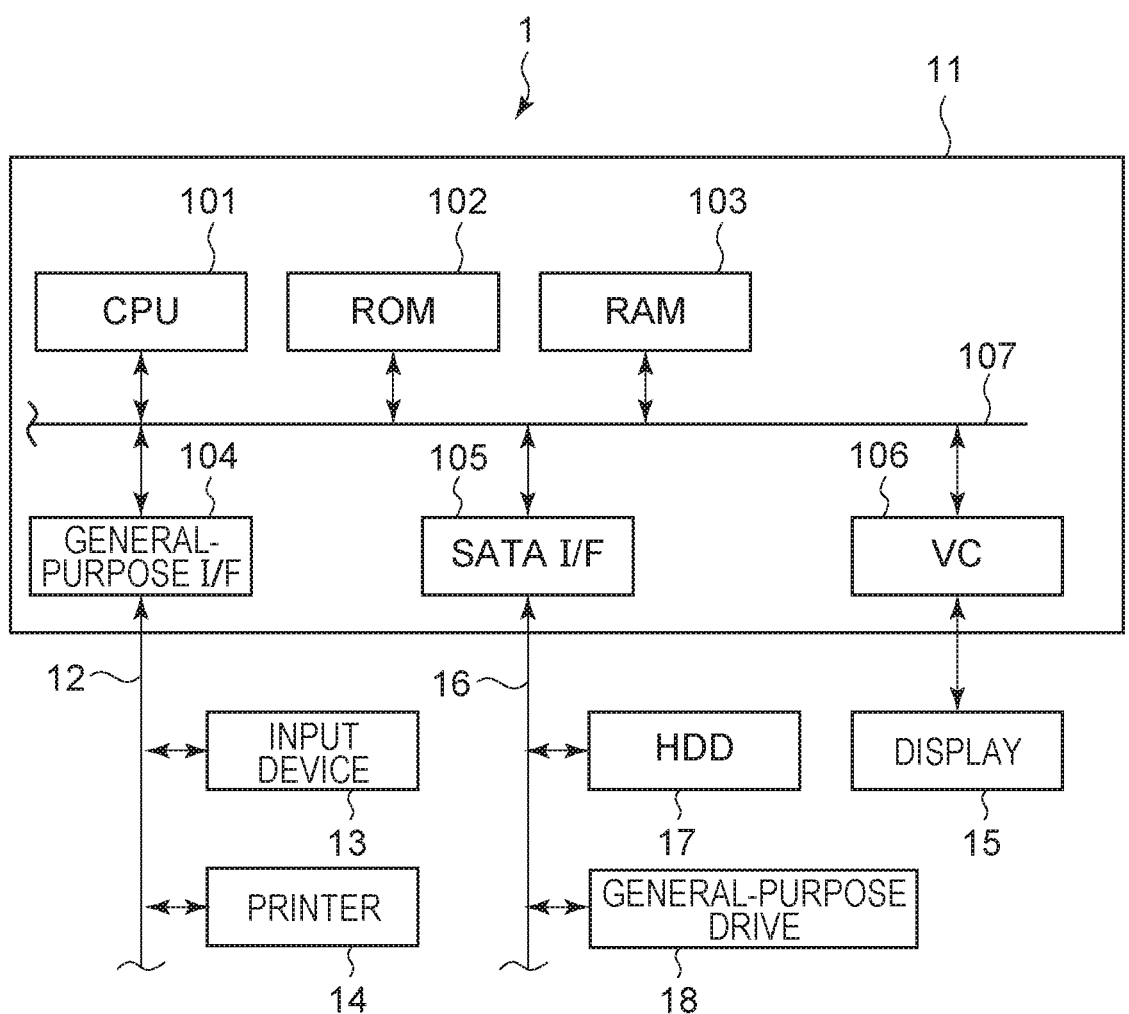
FIG. 1 is a block diagram illustrating the hardware configuration of an image processing apparatus 1 according to an embodiment.

FIG. 1 illustrates a hardware configuration example of an image processing apparatus 1 according to the present embodiment. The image processing apparatus 1 is made up of a computer 11 for example, and executes an OS (operating system) and various types of programs stored in ROM 102, an HDD (hard disk drive) 17 and so forth, using RAM 103 as work memory. The CPU 101 controls the configurations via a system bus 107. Note that processing in the later-described flowcharts is executed by program code stored in the ROM 102, HDD 17, or the like being loaded to the RAM 103, and executed by a CPU 101. A general-purpose I/F (interface) 104 is a serial bus interface such as a USB for example, with an input device 13 such as a mouse or keyboard or a like, a printer 14, and so forth being connected via a serial bus 12. A SATA (serial ATA) I/F 105 is a serial bus interface with the HDD 17 and the general-purpose drive 18 that performs read/write of various types of recording media being connected via a serial bus 16. The CPU 101 uses the HDD 17 and various types of media mounted to the general-purpose drive 18 as storage locations for various types of data. A VC (video card) 106 is a video interface, to which a display 15 is connected. The CPU 101 displays a UI (user interface) provided by a program on the display 15, and receives input of user instructions accepted via the input device 13.

Figure 2:
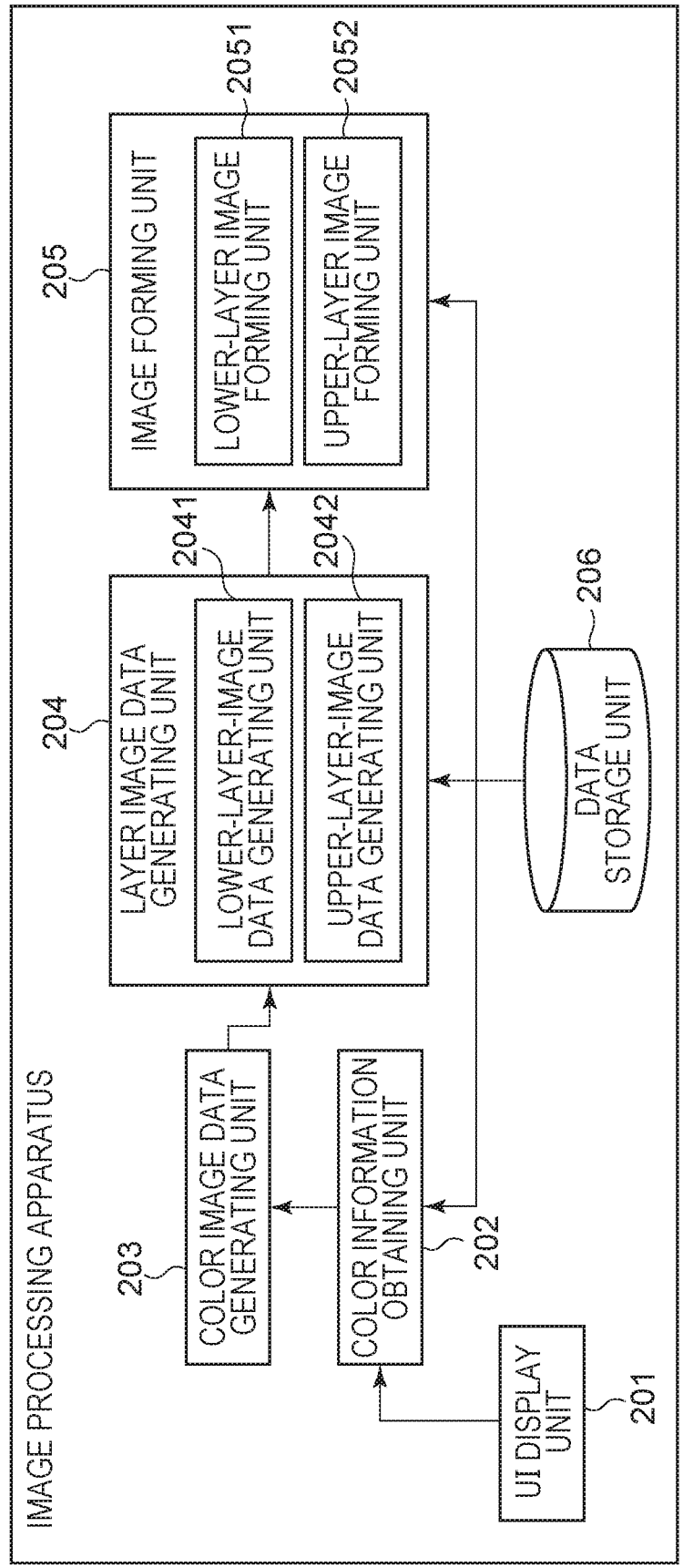
FIG. 2 is a block diagram illustrating the function configuration of the image processing apparatus 1 according to an embodiment.

FIG. 2 is a functional block diagram of the image processing apparatus 1 according to the present embodiment. The contents of processing executed by an image processing application included in the above-described various types of programs based on commands from the CPU 101 will be described with reference to FIG. 2. The image processing apparatus 1 includes a UI display unit 201, a color information obtaining unit 202, a color image data generating unit 203, a layer image data generating unit 204, an image forming unit 205, and a data storage unit 206. The layer image data generating unit 204 further has a lower-layer-image data generating unit 2041 and an upper-layer-image data generating unit 2042, and the image forming unit 205 has a lower-layer-image forming unit 2051 and an upper-layer-image forming unit 2052. The UI display unit 201 is realized by the display 15, with a GUI (graphical user interface) or the like that accepts input from a user being displayed on the external display 15. The color information obtaining unit 202 obtains input image data including color information in accordance with information input by the user. The color image data generating unit 203 generates color image data from the input image data obtained by the color information obtaining unit 202. The lower-layer-image data generating unit 2041 and upper-layer-image data generating unit 2042 generate image data indicating an image to be formed on a recording medium. The lower-layer-image forming unit 2051 and upper-layer-image forming unit 2052 instruct an external printer 14 to form each image data that has been input on a recording medium as an image. The data storage unit 206 stores information of property values and so forth of each ink that the printer 14 is provided with, beforehand. Detailed control operations of each part will be described later.

Figure 3:
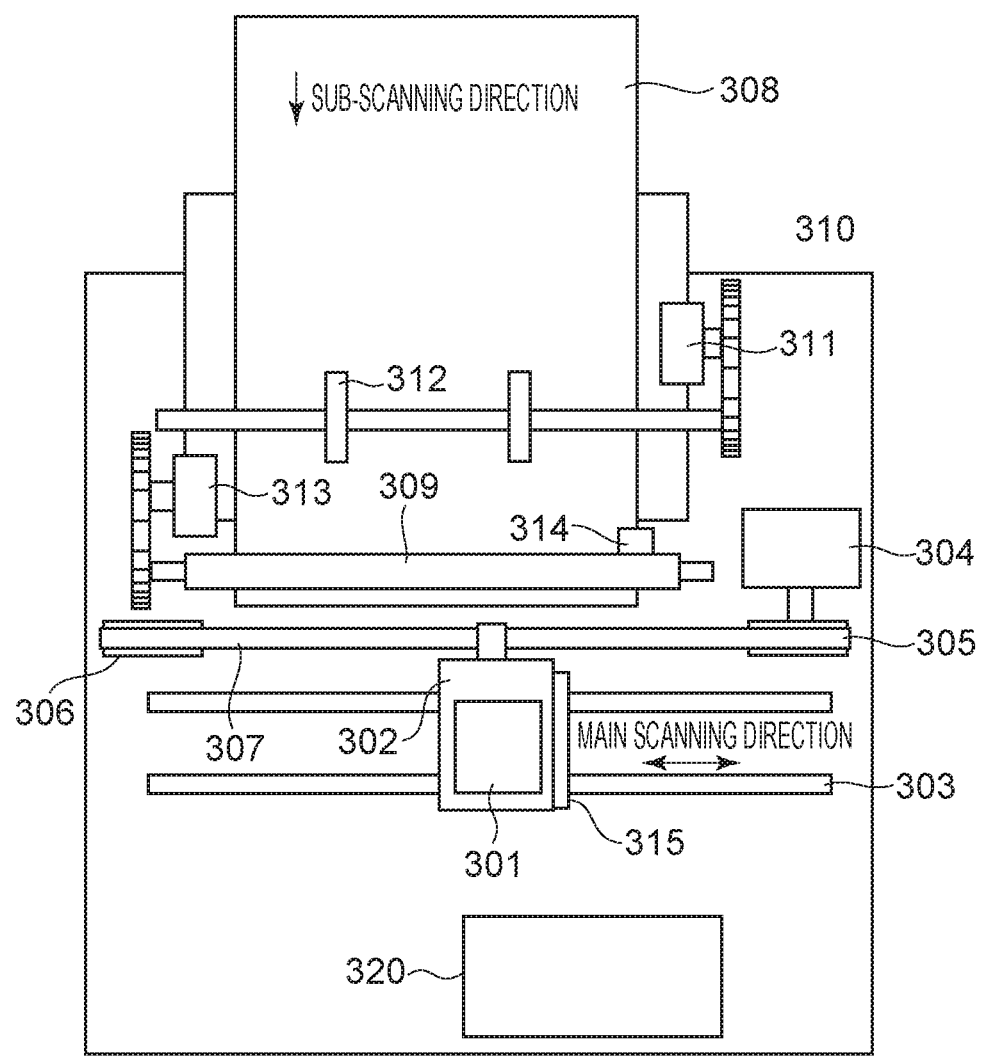
FIG. 3 is a diagram illustrating the configuration of a printer 14 according to an embodiment.

FIG. 3 illustrates a configuration diagram of the printer 14. Provided on a head cartridge 301 is a recording head including multiple discharge orifices, an ink tank that supplies ink to the recording head, and a connector for receiving signals that drive the discharge orifices of the recording head. The head cartridge 301 is replaceably mounted on a carriage 302. The carriage 302 is provided with a connector holder to transmit drive signals and so forth to the head cartridge 301 via a connector. The carriage 302 is configured so as to be capable of reciprocal movement along a guide shaft 303. Specifically, the carriage 302 is driven by a drive mechanism of a motor pulley 305, a slave pulley 306, a timing belt 307, and so forth, with a main scanning motor 304 as the drive source, and the position and movement thereof is controlled. Movement of this carriage 302 following the guide shaft 303 is referred to as "main scanning", and the direction of movement is referred to as "main scanning direction". A recording medium 308 for printing is stacked on an ASF (automatic sheet feeder) 310. When forming an image on the recording medium 308, a pickup roller 312 rotates in accordance with driving by a sheet feed motor 311, and the recording medium 308 is separated from the ASF 310 one sheet at a time and fed. Further, the recording medium 308 is conveyed to a recording start position facing the discharge orifice face of the head cartridge 301 on the carriage 302 by rotation of a conveyance roller 309. The conveyance roller 309 is driven by a gear with a line feed motor 13 as a drive source. Determination of whether a recording medium 308 has been supplied, and finalization of the position when feeding, is performed when the recording medium 308 passes an end sensor 314. The head cartridge 301 mounted on the carriage 302 is held with the discharge orifice face protruding downwards from the carriage 302 so as to be parallel to the recording medium 308. A control unit 320 is made up of a CPU, storage means, and so forth, and receives external image data of a resolution corresponding to printer properties (hereinafter referred to as printer resolution), and controls operations of the parts based on this image data.

Image formation operations by the parts controlled by the control unit 320 will be described below. First, upon the recording medium 308 being conveyed to the recording start position in order to form a lower-layer image, the carriage 302 moves along the guide shaft 303 above the recording medium 308, and discharges glossy ink from the discharge orifices of the recording head when moving. When the carriage 302 moves to one end of the guide shaft 303, the conveyance roller 309 conveys the recording medium 308 by a predetermined amount in a direction perpendicular to the scanning direction of the carriage 302. This conveyance of the recording medium 308 will be referred to as "sheet feed" or "sub-scanning", and this conveyance direction will be referred to as "sheet feed direction" or "sub-scanning direction". When conveying of the recording medium 308 in the sub-scanning direction by a predetermined amount ends, the carriage 302 moves along the guide shaft 303 again. Thus, scanning by the carriage 302 of the recording head and sheet feed is repeated. Accordingly, a lower-layer image is formed on the entire recording medium 308. After the lower-layer image is formed, the conveyance roller 309 returns the recording medium 308 to the recording start position, ink of the colors of cyan, magenta, yellow, and black are discharged on upper layers on the lower-layer image by the same process by which the lower-layer image was formed, thereby forming an upper-layer image. To simplify description, the recording head of the printer 14 is controlled by binary values of whether or not to discharge ink droplets, and a state where discharge of ink droplets has all been set to on in one pixel region of image data of a predetermined resolution, will be handled as ink amount of 100%. Although recording heads capable of modulating the amount of discharge of ink are generally used, the above-described binarization processing is applicable of extended to multivaluing processing of multiple levels that can be modulated, and is not restricted to binarization. The glossy ink used for forming the lower-layer image is white ink having properties of readily exhibiting diffused reflection of incident light according to the present embodiment. A face covered by white ink formed to 100% white-ink amount has lower glossiness than the recording medium. Silver media having a high glossiness, such as aluminum vapor deposition sheets or the like, are used for the recording medium.

Figure 4A:
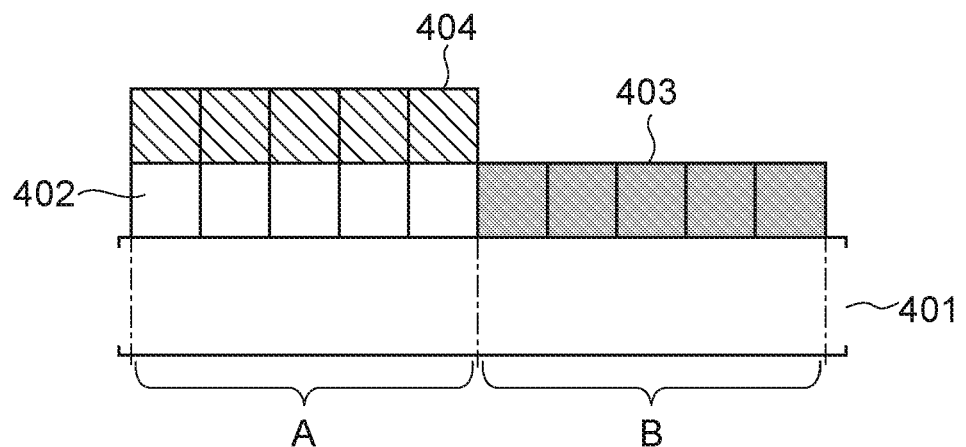
FIGS. 4A and 4B are schematic cross-sectional views of an image formed on a recording medium in an embodiment.

FIG. 4A illustrates a schematic view of a cross-section of a printed product formed through later-described processing contents by the image processing apparatus 1 according to the present embodiment. In the drawing, 401 denotes silver media, which is the recording medium used in the present embodiment. The rectangles denoted by 402 through 404 in the drawing represent white ink and color ink, and the width of the rectangles is equivalent to the size of one pixel of image data of a predetermined resolution, that the printer 14 receives. In the present embodiment, the printer resolution is 1200 dpi, and the rectangle width is approximately 20 μm. Although the shape of a discharged ink droplet is decided by processes such as wetting and spreading based on physical properties of the ink and the landing face. However, the shape of ink fixed on the recording medium will be described as being a rectangle in the present embodiment, to simplify description. In the drawing, 402 denotes white ink, 403 cyan ink, and 404 yellow ink. A region A where the silver media 401 is covered by white ink 402 is a region where the incident light is diffusely reflected more readily as compared to a region B where the silver media is not covered. Color inks having different absorption wavelength bands, such as cyan ink 403 and yellow ink 404 are disposed on the region A and region B, respectively. The region A and region B here are a 5×5 pixel region, equivalent to approximately 100×100 μm, which is the smallest control increment of reflection properties of light. Also, a 10×10 pixel region, equivalent to approximately 200×200 μm, where 2×2 regions A and B have been arrayed, is the smallest control increment of reflection diffuse reflected color and spectral reflected color. Note that different sizes may be set as control units, taking into consideration deterioration in reproducibility due to driving precision of the recording head, this sort of size of control units is preferably set, based on visual angle properties. For example, visual angle resolution S and resolution R can be derived from the following expressions, where eyesight is E and observation distance is D.

$$S=\tan\{(2\times3.14)/E/(360\times60)\}\times D \quad \text{(Expression 1)}$$

$$R=25.4\times10^{-3}/S \quad \text{(Expression 2)}$$

According to Expression 1 and Expression 2, visual angle resolution of 80 μm is obtained corresponding to common observation conditions of visibility distance of 250 mm and eyesight of 1.0, for example, and this size can be set as a control unit size of color of reflected light. Accordingly, the control unit of color of reflected light is sensed as being one region. Alternatively, the size may be decided based on known visual angle sensitivity properties, such as the Barten model, for example, or an appropriate size may be decided by performing subjective evaluation experimentation under geometric conditions where printed products formed by the present embodiment are observed. The results of subjective evaluation experimentation performed to decide this size are shown next.

Subjective evaluation experimentation was performed from the two perspectives of, when viewing a printed product formed through the process according to the present embodiment, "can layout patterns of region A and region B be distinguished" and "does the color change according to the angle of viewing". Samples to be evaluated are printed products formed by processing according to the present embodiment, using a printer having a resolution of 720 dpi and provided with color ink and white ink, and silver media. It can be seen from Expression 1 that with resolutions of 350 dpi or higher, region A and region B are so fine that they are sensed as being a single region, so samples were created with resolution of 360 dpi or lower, by taking two pixels of 720 dpi as a single pixel. The samples were numbered from 1 through 12 by resolution, and subjective evaluation was performed for each sample. The evaluation environment is an office with fluorescent lights installed in the ceiling. The evaluators were to select from three stages of ○, Δ, and x. In the perspective of pattern distinguishing, the ○ means "pattern cannot be distinguished", the Δ means "pattern cannot be distinguished but granularity is noticeable", and the x means "pattern can be distinguished". In the perspective of change in color, the ○ means "change in color was sensed", the Δ means "change in color was sensed somewhat", and the x means "change in color cannot be sensed".

The results of the above-described subjective evaluation experimentation are illustrated in FIG. 25. The numerical values in the table represent the percentage of the number of people selecting each of the ○, Δ, and x, as to the total number of people. From these results, it was confirmed that change in color was sensed even at 30 dpi, which was the lowest resolution in the experiment performed this time. Regarding pattern distinguishing, it can be seen that printing where patterns cannot be recognized can be performed at 51 dpi and above. That is to say, it was confirmed from the experimentation that different colors can be sensed depending on the angle of viewing if the printed product has resolution of 30 dpi or higher, and further, the resolution is preferably 51 dpi or higher so that the region A and region B patterns cannot be distinguished. It is also preferable for the resolution to be 60 dpi or higher, in order to reduce granularity.

Figure 5A:
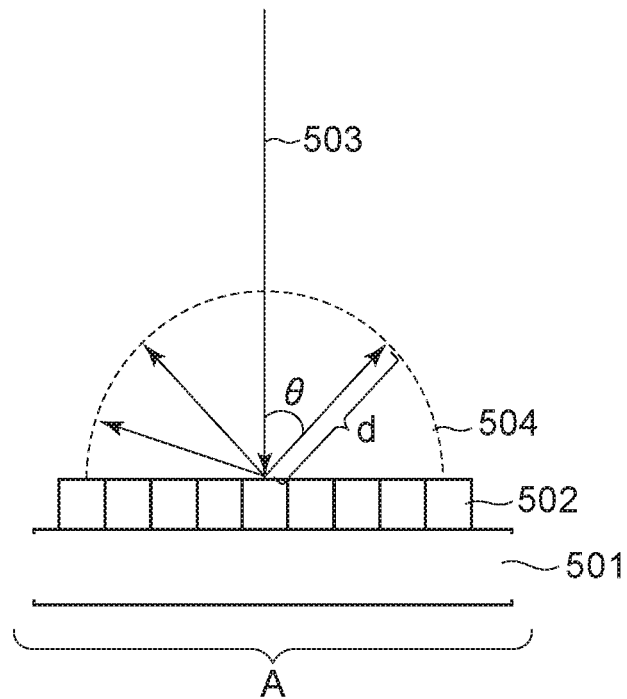
FIGS. 5A and 5B are diagrams for describing reflective properties of light at an image formed on a recording medium in an embodiment.
Figure 5B:
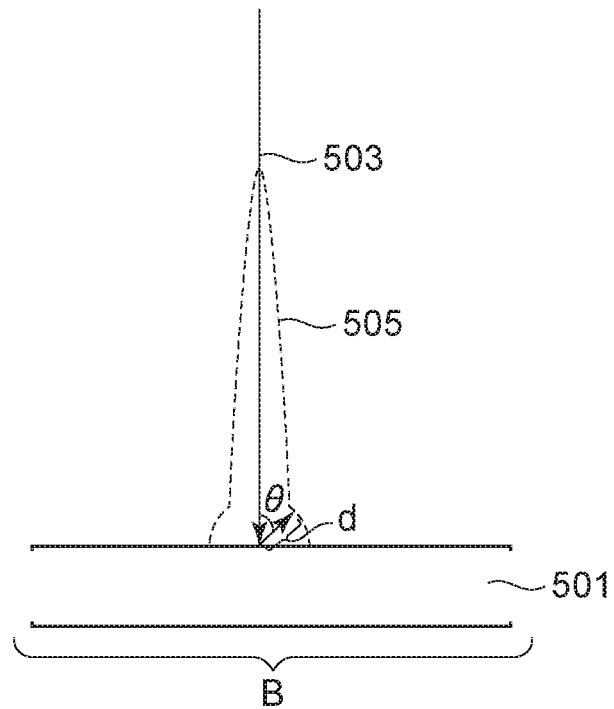

Next, the difference in reflection properties of light at region A which is a region where the silver media is covered by white ink, and region B which is a region where silver media is not covered by white ink, will be described with reference to FIGS. 5A and 5B. FIG. 5A is a diagram schematically showing reflected light of light 503 incident to the white ink 502 covering the silver media 501, with the intensity of reflected light at angle θ expressed as distance d to the dotted line 504. At the white ink, which has properties of readily exhibiting diffuse reflection, reflection occurs at a generally uniform intensity regardless of the angle θ, as shown in the drawing. FIG. 5B is a diagram schematically showing reflected light of light 503 incident to the silver media 501, with the intensity of reflected light at angle θ expressed as distance d to the dotted line 505. The silver media 501 has a high reflection intensity around the spectral reflection direction θ=0 as compared to the face covered by the white ink 502, and has low reflection intensity at other than around the spectral reflection direction, as shown in FIG. 5A. Note that the relative relation of reflection properties of this light is maintained in region A and region B with color ink disposed on the upper layer thereof. The above-described respective reflection properties of light is not restrictive, as long as region A and region B have reflection properties of light where the proportion of reflection intensity as to each other differ between one direction out of the directions of incident light and another direction. Note, however, that reflection properties of light in the regions more preferably is similar to a total diffuse reflection surface where reflection occurs at a uniform intensity regardless of the angle, and a mirror surface where reflection occurs only in the spectral reflection direction.

Next, the difference in color visually recognized when observing a macro region O including the smallest control increment regions for color of reflected light, i.e., region A and region B, from a diffuse reflection direction and specular reflection direction, will be described with reference to FIGS. 6A through 6E. The dotted lines indicated by 611 and 612 in the drawing represent the intensity of reflected light when light perpendicularly enters the printed product 610, in the same way as in FIGS. 5A and 5B. When observing the region O from the non-specular reflection direction 615 shown in FIG. 6A, a color where reflected light indicated by 613 and 614 are integrated is visually recognized. As described above, the reflected light 613 in region A has a high reflection intensity as compared to the reflected light 614 in region B at the non-specular reflection direction, so a tinge close to yellow, which is the color of the reflected light at the region A, can be observed in the region O. In the same way, when observing from the specular reflection direction 623, reflected light indicated by 621 and 622 are integrated, and a tinge close to cyan, which is the color of the reflected light at the region B, can be observed. Although description has been made using the primary colors of cyan and yellow, but the same control can be performed using other primary colors, or using secondary colors reproduced by mixing an optional combination of cyan, magenta, yellow, and black. The contents of the series of processing by the image processing apparatus 1 that performs image processing to form printed products having a layout of multiple regions where region A and region B coexist will be described below.

Figure 7A:
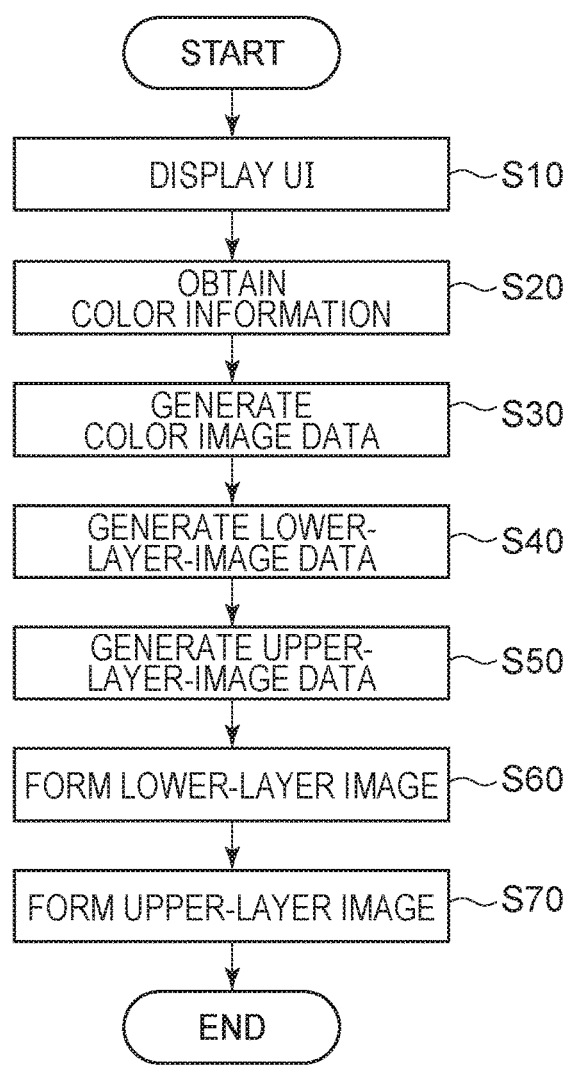
FIGS. 7A through 7C are flowcharts illustrating processing of the image processing apparatus 1 in a first embodiment.
Figure 7B:
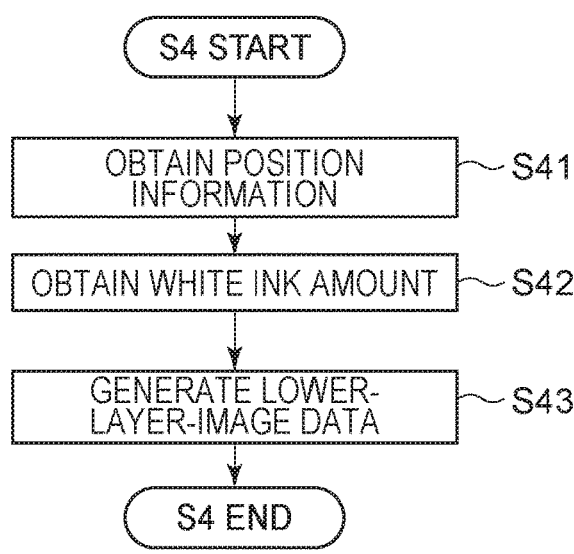
Figure 7C:
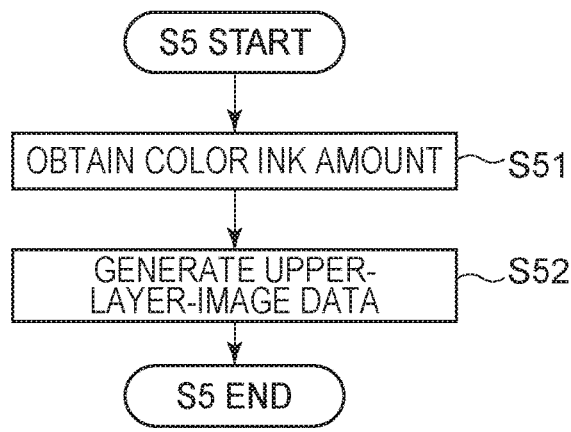

FIGS. 7A through 7C are flowcharts illustrating the contents of processing by the image processing apparatus 1 according to the present embodiment. The contents of processing by the image processing apparatus 1 according to the present embodiment will be described in detail below with reference to FIGS. 7A through 7C. Note that the processing in the flowcharts shown in FIGS. 7A through 7C is executed by the CPU 101, program code stored in the ROM 102 having been loaded to the RAM 103. The flowcharts shown in FIGS. 7A through 7C are started by a user inputting an instruction by operating the input device 13 and the CPU 101 accepting the input instruction. Hereinafter, the steps (processes) are indicated by an S in front of a reference numeral.

Figure 8:
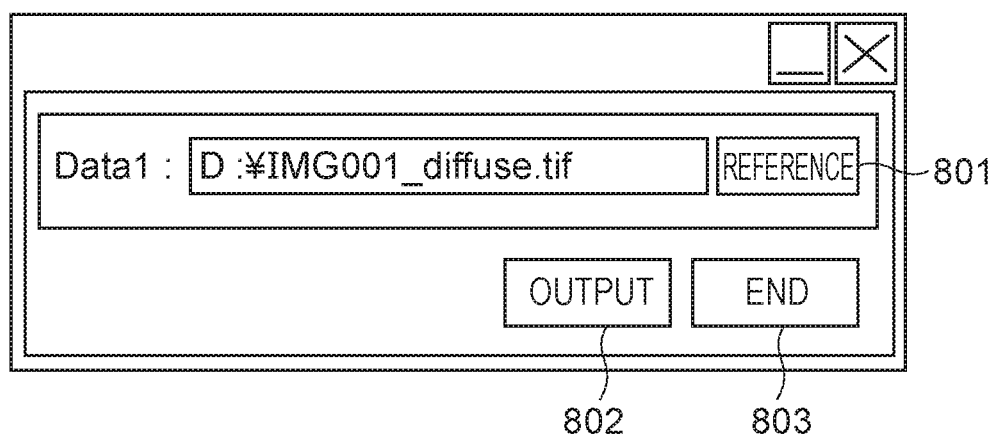
FIG. 8 is a diagram illustrating an example of a UI according to the first embodiment.
Figure 24A:
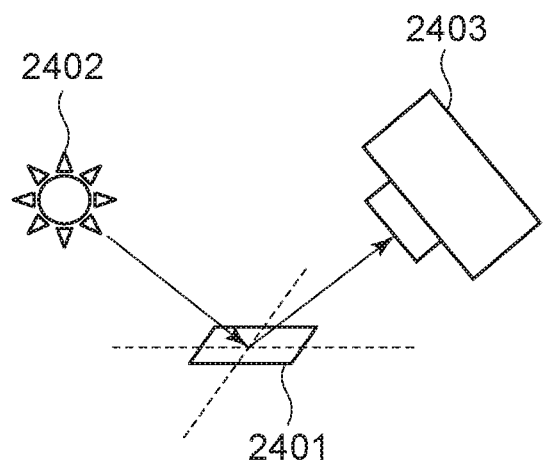
FIGS. 24A through 24C are schematic diagrams illustrating an example of an input image data generating method in the first embodiment.
Figure 24B:
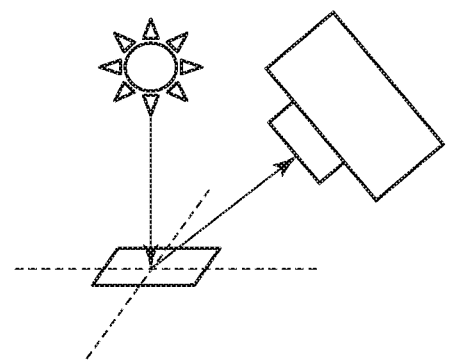
Figure 24C:
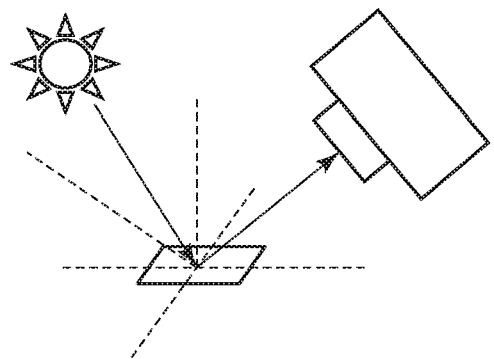

In S10, two input image data are obtained. First, the UI display unit 201 displays a UI prompting the user to input necessary information on the display 15, in order to accept input of information that is necessary for the image processing apparatus 1. FIG. 8 illustrates an example of a UI prompting the user for input in the present embodiment. An input region 801 is an instruction inputting portion to instruct a path and filename for a data file recorded in a storage device such as the HDD 17 or the like beforehand. The data file corresponding to the path and filename of which an instruction has been input is data regarding two RGB images, taken using an imaging apparatus 2403, under geometric conditions such as illustrated in FIGS. 24A through 24C. Specifically, this is data of an RGB image where a subject 2401 has been imaged from the spectral reflection direction of incident light from a light source 2402 such as illustrated in FIG. 24A, and data of an RGB image where the subject 2401 has been imaged from the non-spectral reflection direction of incident light from the light source 2402 such as illustrated in FIG. 24B. This RGB image data will be referred to as input image data. Note that these do not have to be stored beforehand, and may be processing of directly inputting two input image data. Also, these may be a non-spectral reflection direction RGB image and a spectral reflection direction that have been taken with the position of the imaging apparatus changed, instead of the light source position as illustrated in FIGS. 24A through 24C. At this time, later-described color image data can be generated by performing correction regarding differences from geometric conditions by known distortion correction processing, such as affine transformation or the like. Returning to FIG. 8 again, an output button 802 is a region that accepts an instruction to start printing processing on the recording medium. An end button 803 is a region that accepts an instruction to end the series of processing illustrated in FIGS. 7A through 7C. When the user inputs instruction of the path and filename of the image data file to the input region 801, and then presses the output button 802, the flow advances to S20.

Figure 9A:
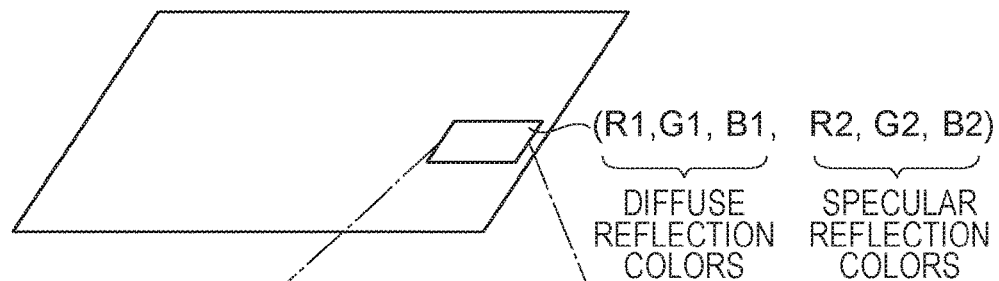
FIGS. 9A and 9B are diagrams for describing color image data in the first embodiment.

In S20, the color information obtaining unit 202 obtains the above-described two input image data corresponding to information instructed by the user via the UI in S10, from the data storage unit 206. In S30, the color image data generating unit 203 generates color image data that is six-channel image data, by taking each of the RGB values of the two input image data obtained in S20 as diffuse reflection color and spectral reflection color, and storing as layer pixel values of one image file. At this time, the RGB values of the input image data obtained by imaging from the non-spectral reflection direction of incident light are represented by diffuse reflection color R1, G1, and B1, and the RGB values of the input image data obtained by imaging from the spectral reflection direction of incident light are represented by spectral reflection colors R2, G2, and B2. The data configuration of this color image data is schematically shown in FIG. 9A. As illustrated in the drawing, RGB values corresponding to diffuse reflection color and spectral reflection color are stored in each pixel of the color image data in each channel, and these RGB values are defined on an sRGB space. Note that the color information may be other formats, such as RGB values defined on an Adobe RGB space, L*a*b* values defined on a L*a*b* space, or the like. Also, the resolution of the image that the color image data indicates is 120 (1200/10) dpi where the smallest control increment of the above-described diffuse reflection color and spectral reflection color is one pixel.

In S40, the lower-layer-image data generating unit 2041 generates lower-layer-image data storing the amount of white ink, for each pixel. The lower-layer-image data has a resolution of 1200 dpi. Details of the processing operations will be described later. In S50, the upper-layer-image data generating unit 2041 generates upper-layer-image data, where color ink amount is stored for each pixel, based on the lower-layer-image data and the color image data. The upper-layer-image data has a resolution of 1200 dpi. Details of the processing operations will be described later.

In S60, the lower-layer-image forming unit 2051 performs known halftone processing and path decomposition, based on lower-layer-image data, decides recording dot positions for each recording scan, and generates image formation data, following which forming operations of the lower layer image is executed by the above-described printer 14. In S70, the upper-layer-image forming unit 2052 performs known halftone processing and path decomposition, based on upper-layer-image data, decides recording dot positions for each recording scan, and generates image formation data, following which forming operations of the upper layer image is executed by the above-described printer 14. This completes the series of image formation processing regarding the image data. Next, the details of processing in S40 and S50 will be described.

The details of processing of generating lower-layer-image data (S40) will be described with reference to FIG. 7B. The lower-layer-image data that the lower-layer-image data generating unit 2041 generates in the present embodiment is grayscale image data of a predetermined resolution, corresponding to the amount of white ink for each pixel value. Note that the data format of the lower-layer-image data may be another format, as long as layout information for forming regions with different light reflection properties is included.

Figure 9B:
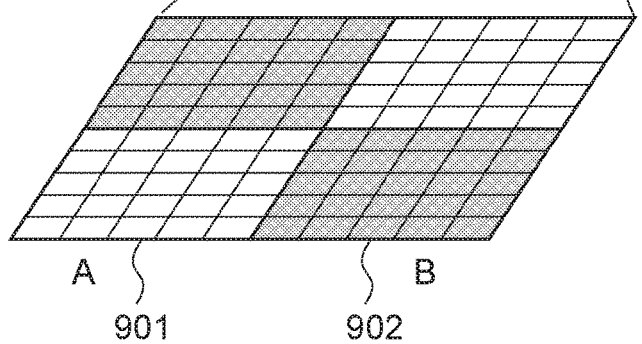

In S41, layout information for the region A and region B in the smallest control increment regions for the color of reflected light is obtained from the data storage unit 206 in S41. Layout information is a binary pattern where the layout of two regions, region A 901 and region B 902, has been recorded (hereinafter referred to as layout pattern), which has been stored in the data storage unit 206 beforehand as 10×10 pixel binary image data, as illustrated in FIG. 9B, for example. Note that a value of 0 corresponds to region A 901, and 1 to region B 902.

In S42, the binary image data is converted into grayscale image data where the pixel values are the amount of white ink based on a conversion table where the binary values of 0 and 1 described above, and the amount of white ink have been correlated. FIG. 10A shows the data format of the conversion table. As described above, the region A is reproduced with a white ink covering face, and the region B with the silver media, so the binary information is converted into the two values representing white ink amount 100% and 0%, respectively.

In S43, the lower-layer-image data is generated based on the color image data generated in S30 and the grayscale image data converted in S42. Specifically, 1200 dpi grayscale image data where the pixels of the 120 dpi color image data have been replaced by 10×10 pixel grayscale image data is generated. The 1200 dpi grayscale image data generated in this step is the lower-layer-image data. Note that an arrangement may be made where the binary image data corresponding to the layout of the two regions of region A and region B is the lower-layer-image data, and the processing of converting to the amount of white ink, described in S42, may be processed within the printer 14 at the lower-layer-image forming unit 2051.

Next, the details of processing of generating upper-layer-image data (S50) will be described with reference to FIG. 7C. The upper-layer-image data that the upper-layer-image forming unit generates in the present embodiment is four-channel color image data having resolution of 1200 dpi, where pixel values corresponding to the amount of CMYK ink for each pixel are stored. Note that the data format of the upper-layer-image data may be another format, as long as layout information for forming regions with different color information on the lower layer image is included.

In S51, a color separation LUT (Look Up Table) correlating the RGB values of the color image data and the amount of CMYK ink is obtained from the data storage unit 206, and the amount of color ink for each pixel of the color image data is decided by referencing the LUT. The CMYK ink amounts C1, M1, Y1, and K1, corresponding to the diffuse reflection colors R1, G1, and B1, and the CMYK ink amounts C2, M2, Y2, and K2, corresponding to the spectral reflection colors R2, G2, and B2, are derived here from the LUT. FIG. 10B shows an example of the data format of the LUT. In the present embodiment, the amount of CMYK ink is decided using the same LUT such as shown in FIG. 10B, from the diffuse reflection color RGB values and spectral reflection color RGB values. In this case, the color reproduced differences depending on the base, such as the white ink of region A and silver media of region B, so different LUTs are preferably referenced for each. At this time, the LUT corresponding to diffuse reflection color can be generated by measuring color reproducibility properties regarding multiple color charts formed with different amounts of ink of each of CMYK on a face coated with white ink, and performing color matching processing based on these color reproducibility properties. In the same way, the LUT corresponding to spectral reflection color can be generated by measuring color reproducibility properties regarding multiple color charts formed as described above on silver media, and performing color matching processing based on these color reproducibility properties. Known technology can be used for the color matching processing, such as minimum color difference mapping where distances on color space are smallest, minimum color difference mapping where maintaining hue angle is a constraint, and so forth. Note that an arrangement may be made where, instated of deciding CMYK ink amounts individually, a single LUT is used to decide each CMYK ink amount using the LUT illustrated in FIG. 10C, for example. Each CMYK ink amount corresponding to 15625 (5^6) combinations with each RGB value divided five ways has stored in the example illustrated in FIG. 10C. Using this LUT enables reproduction of color properties taking into consideration the effects that the amount of CMYK ink on region A will have on the spectral reflection color, while taking into consideration the effects that the amount of CMYK ink on region B will have on the diffuse reflection color. This LUT can be generated by measuring color reproducibility properties integrated in the smallest control increment regions of color of reflected light, for each combination of CMYK ink amounts, and performing color matching processing based on these color reproducibility properties.

In S52, the upper-layer-image data is generated based on the CMYK ink amount obtained in S51, and the lower-layer-image data generated in S40. The upper-layer-image data generated in this step is four-channel color image data, where the CMYK ink amount obtained in S51 is stored for each pixel. This upper-layer-image data is image data of 1200 dpi resolution, corresponding one pixel of color image data corresponding to 10×10 pixels. The CMYK ink amount corresponding to diffuse reflection color obtained in S51, and the CMYK ink amount corresponding to spectral reflection color, are laid out within 10×10 pixels, with reference to the lower-layer-image data here. Specifically, pixels of the same coordinates as those in the lower-layer-image data each store the CMYK ink amount corresponding to diffuse reflection color if in region A (white ink amount 100%), and the CMYK ink amount corresponding to spectral reflection color if in region B (white ink amount 0%).

AS described above, the image processing apparatus 1 according to the present embodiment generates color image data storing color information indicating diffuse reflection color and spectral reflection color, and controls the amount of discharge of white ink and color ink, based on the color image data. Accordingly, a printed product where diffuse reflection color and spectral reflection color are controlled can be formed.

Second Embodiment

A form has been described in the first embodiment where two input image data, indicating diffuse reflection color and spectral reflection color, are used to generate color image data. In the present embodiment, multiple UI examples will be described regarding a form where the user directly instructs color information to serve as a reproduction target via a UI, and this color information is used for forming the color image data. Note that the functional configuration of the image processing apparatus 1 in the second embodiment is the same as that in the first embodiment. Processing for generating color image data having color information for a reproduction target (S10 through S30), by the UI display unit 201, color information obtaining unit 202, and color image data generating unit 203, is different from the first embodiment, so in the present embodiment, the contents of this processing will primarily be described below.

Figure 11A:
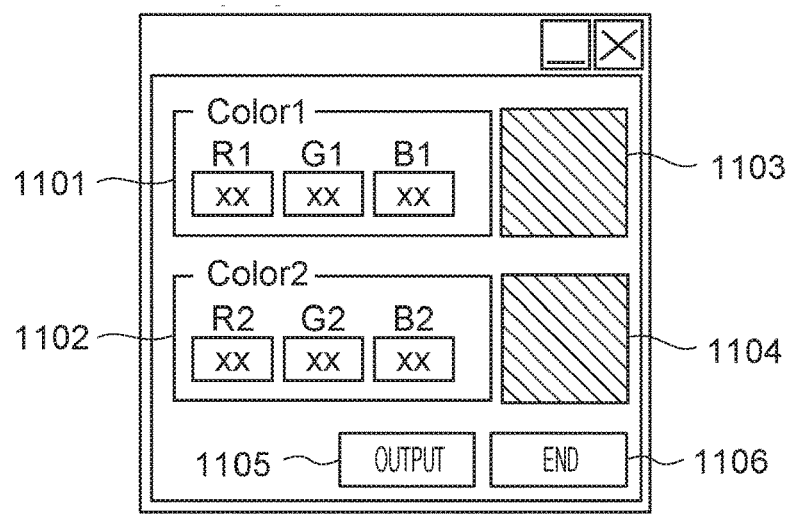
FIGS. 11A through 11C is a diagram illustrating an example of a UI according to a second embodiment.

First, a form where color information indicating uniform diffuse reflection color and spectral reflection color in the printing region is directly input at a UI will be described with reference to FIG. 11A. In S10, the UI display unit 201 displays a UI prompting the user to input necessary information on the display 15, in order to accept input of information that is necessary for the image processing apparatus 1. FIG. 11A illustrates a UI prompting the user for input. Input regions 1101 and 1102 are instruction input portions for instructing diffuse reflection color and spectral reflection color. Also, upon color information being updated by the user performing input of instruction, display portions 1103 and 1104 reproduce this color information on the display with the color reproducibility properties of the display 15 added in. The diffuse reflection color and spectral reflection color are RGB values defined in sRGB space, but may be other formats, such as Adobe RGB or CIELAB values or the like. Note that the color information to be input may be a form where the user is presented with multiple color information recorded in the data storage unit 206 beforehand on a UI, and the user selects from the preset multiple color information via the UI. Returning to FIG. 11A again, an output button 1105 is a region that accepts an instruction to start printing processing on the recording medium. An end button 1106 is a region that accepts an instruction to end the series of processing of the image processing apparatus 1. When the user inputs instruction of color information to the input regions 1101 and 1102, and then presses the output button 1105, the flow advances to S20.

In S20, the diffuse reflection color R1, G1, and B1, and the spectral reflection color R2, G2, and B2, regarding which the user has input instruction in S10, are obtained. In S30, color image data is generated using the color information obtained in S20. Regarding the format of the color image data, the resolution of the image that the color image data indicates is 120 (1200/10) dpi where the smallest control increment of color of reflected light is one pixel, the same as in the first embodiment, and the color image data is six-channel image data where RGB values of diffuse reflection color and spectral reflection color are stored in each pixel. The RGB values of diffuse reflection color and spectral reflection color are the values instructed by input in S10, and are stored uniformly for all pixels. Subsequently, executing the processing described in S40 through S70 described in the first embodiment, based on this color image data, enables image processing to be formed for forming a printed product where uniform diffuse reflection color and spectral reflection color have been control within the printing region.

Figure 11B:
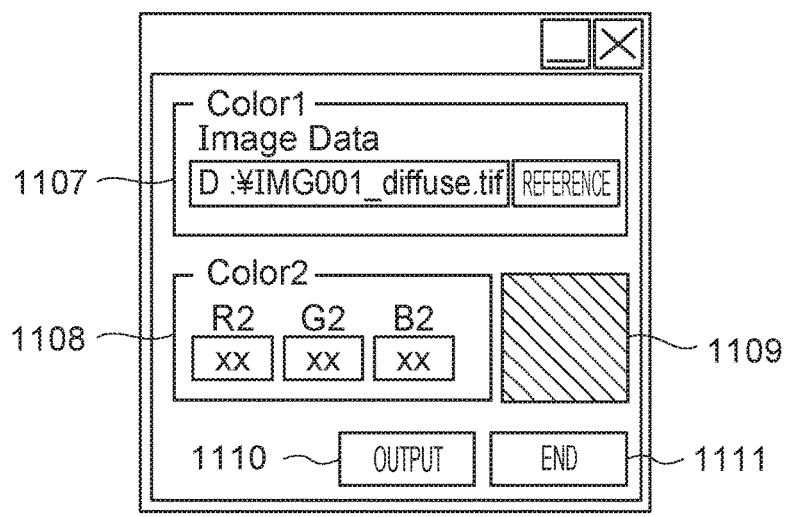

Next, a form will be described with reference to FIG. 11B, where input image data indicating diffuse reflection color is instructed by inputting at a UI, and further color information indicating spectral reflection color is directly instructed by input. In S10, the UI display unit 201 displays a UI prompting the user to input necessary information on the display 15, in order to accept input of information that is necessary for the image processing apparatus 1. FIG. 11B illustrates an example of a UI prompting the user for input. An input region 1107 is an instruction inputting portion to instruct a path and filename for a data file recorded in a storage device such as the HDD 17 or the like beforehand. The data file corresponding to the path and filename of which an instruction has been input is input image data of which color information of diffuse reflection color is stored in each pixel, and the color information indicates RGB values defined in sRGB space, but may be other formats, such as Adobe RGB or CIELAB values or the like. Also, the input image data may be image data obtained by imaging from the non-spectral reflection direction of incident light, as in the first embodiment. The resolution of the image that the input image data indicates is 120 (1200/10) dpi where the smallest control increment of the color of reflected light described above is one pixel. Returning to FIG. 11B again, input region 1108 is an instruction input portion for directly instructing color information of spectral reflection color. Upon color information being updated by the user performing input of instruction at the input region 1108, the display region 1109 reproduces this color information on the display with the color reproducibility properties of the display 15 added in. An output button 1110 is a region that accepts an instruction to start printing processing on the recording medium. An end button 1111 is a region that accepts an instruction to end the series of processing of the image processing apparatus 1. When the user inputs instruction of color information to the input regions 1107 and 1108, and then presses the output button 1110, the flow advances to S20.

In S20, input image data indicating the diffuse reflection color, instructed in S10, and color information indicating spectral reflection color, are obtained. In S30, the one color image data and color information obtained in S20 are used to generate color image data. This color image data is image data where image data of three channels in which RGB values of the input image data indicating the diffuse reflection color instructed in S10 are stored, expanded to six channels, and obtains image data where RGB values indicating the spectral reflection color input in S10 are stored in all pixels of the expanded channels. Subsequently, executing the processing described in S40 through S70 described in the first embodiment, based on this color image data, enables a printed product to be formed where uniform diffuse reflection color has been controlled within the printing region.

Figure 11C:
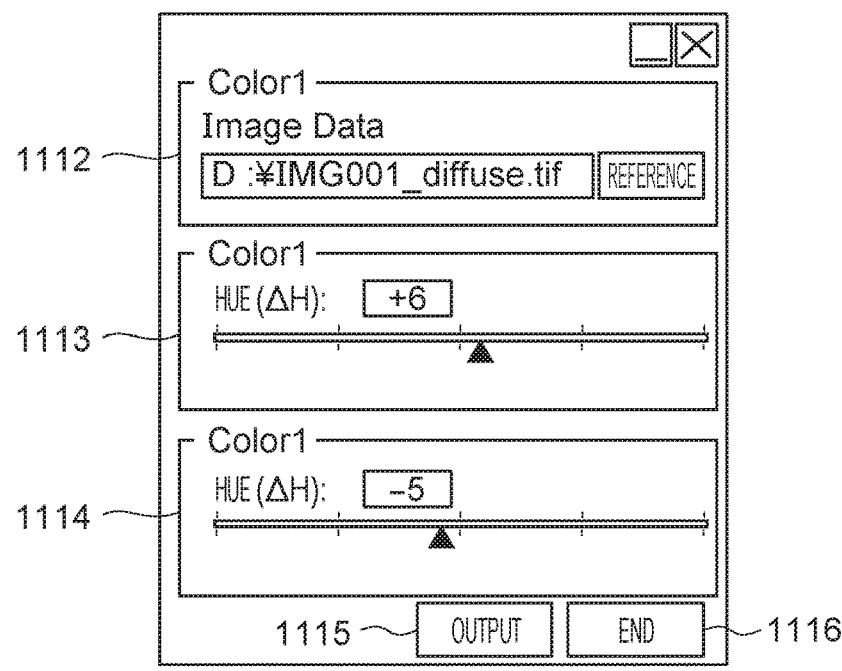

Next, a form will be described with reference to FIG. 11C, where color information serving as a reference for diffuse reflection color and spectral reflection color, and color correction information for generating diffuse reflection color and spectral reflection color from the color information serving as a reference, are input at a UI. In S10, the UI display unit 201 displays a UI prompting the user to input necessary information on the display 15, in order to accept input of information that is necessary for the image processing apparatus 1. FIG. 11C illustrates an example of a UI prompting the user for input. An input region 1112 is an instruction inputting portion to input a path and filename for a data file recorded in a storage device such as the HDD 17 or the like beforehand. The data file corresponding to the path and filename of which an instruction has been input is input image data of which color information serving as a reference for diffuse reflection color and spectral reflection color is stored in each pixel, and the color information indicates RGB values defined in sRGB space, but may be other formats, such as Adobe RGB or CIELAB values or the like. The resolution of the image that the input image data indicates is 120 (1200/10) dpi where the smallest control increment of the color of reflected light described above is one pixel. Returning to FIG. 11C again, input regions 1113 and 1114 are instruction input portions for inputting color correction information used at the time of generating the diffuse reflection color and spectral reflection color from the input image data. The color correction information is a rotation angle of hue h defined in CIELAB space. Note that the color correction information may be chromatic value or the like instated of hue, as long as it is other information representing difference in color properties. An output button 1115 is a region that accepts an instruction to start printing processing on the recording medium. An end button 1116 is a region that accepts an instruction to end the series of processing of the image processing apparatus 1. When the user inputs instruction of color information to the input regions 1112 through 1115, and then presses the output button 1115, the flow advances to S20.

In S20, the two input image data instructed in S10, and the hue rotation angle that is the color correction information are obtained. In S30, color image data is generated from the two input image data and hue rotation angle. Regarding the format of the color image data generated in this step, the resolution of the image that the color image data indicates is 120 (1200/10) dpi where the smallest control increment of the color of reflect light is one pixel, the same as in the first embodiment, and the color image data is six-channel image data where RGB values of diffuse reflection color and spectral reflection color are stored in each pixel. The RGB values of diffuse reflection color stored in each pixel are RGB values obtained by converting the pixel values of the input image data into CIE Lch (RGB→Lch) and the hue rotation angle input to the input region 1113 in S10 added thereto, following which inverse conversion (Lch→RGB) is performed. In the same way, RGB values for spectral reflection color can be obtained by using the hue rotation angle input to the input region 1114 in S10. Subsequently, executing the processing described in S40 through S70 described in the first embodiment, based on this color image data, enables image processing to be formed for forming a printed product where different diffuse reflection color and spectral reflection color are controlled for each pixel.

As described above, image data having diffuse reflection color and spectral reflection color can be generated by the user instructing color information serving as a reproduction target via a UI. Using this image data enables a printed product to be formed where the diffuse reflection color and spectral reflection color are controlled.

Third Embodiment

In the first embodiment, a form has been described where a lower layer image is formed having different reflection proprieties of light in each region, by controlling the amount of white ink on the silver media. In the present embodiment, a form where the formation method of the lower layer image is adaptively changed in accordance with the properties of the media being used, will be described. A difference from the first embodiment is that the printer 14 is provided with silver ink in addition to white ink, as glossy ink. Silver ink is an ink containing a bright material. Covering an optional media with silver ink amount of 100% enables a region having a high reflection intensity in the spectral reflection direction of incident light, i.e., a highly glossy region is formed, as compared to surfaces covered with white ink or other color inks. The functional configuration of the image processing apparatus 1 in the third embodiment is the same as that in the first embodiment. Processing that is different from the above-described embodiments will primarily be described in the present embodiment.

Figure 12:
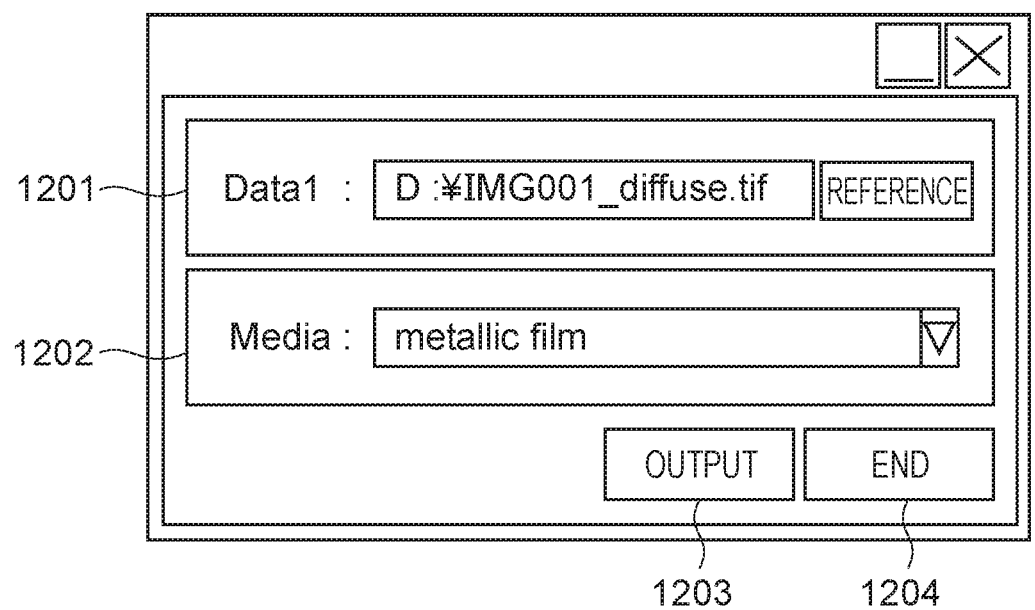
FIG. 12 is a diagram illustrating an example of a UI according to a third embodiment.

In S10, the UI display unit 101 displays a UI prompting the user to input necessary information on the display 15, in order to accept input of information that is necessary for the image processing apparatus 1. FIG. 12 illustrates an example of a UI prompting the user for input in the present embodiment. An input region 1201 is an instruction input portion for instructing input image data, the same as in the first embodiment. An input region 1202 is an instruction input portion for instructing print media to be used as the recording medium. A form is assumed in the present embodiment where the user selects media to use from multiple preset media of which the glossiness is known. Note that a form may be made where this glossiness is directly input. Returning to FIG. 12 again, an output button 1203 is a region that accepts an instruction to start printing processing on the recording medium. An end button 1204 is a region that accepts an instruction to end the series of processing shown in FIGS. 7A through 7C. When the user inputs instructions to the input regions 1201 and 1202, and then presses the output button 1203, the flow advances to S20.

In S20, the color information obtaining unit 202 obtains input image data from the data storage unit 206, by the same processing as in the first embodiment. In the present embodiment, the glossiness corresponding to the media of which instruction has been input in S10 is obtained in addition to the input image data. In S30, the color image data generating unit generates color image data from two input image data, in the same way as in the first embodiment. In S40, the lower-layer-image data generating unit 2041 generates lower-layer-image data that is two-channel image data, with white ink amount and silver ink amount stored for each pixel. The resolution of the lower-layer-image data is 1200 dpi. Details of processing operations will be described later. In S50, the upper-layer-image data generating unit 2042 generates upper-layer-image data, in the same way as in the first embodiment. In S60, the lower-layer-image forming unit 2051 performs formation operations of a lower-layer image by the printer 14 described above, based on the lower-layer-image data. In S70, the upper-layer-image forming unit 2052 performs formation operations of an upper-layer image by the printer 14 described above, based on the upper-layer-image data.

Figure 13:
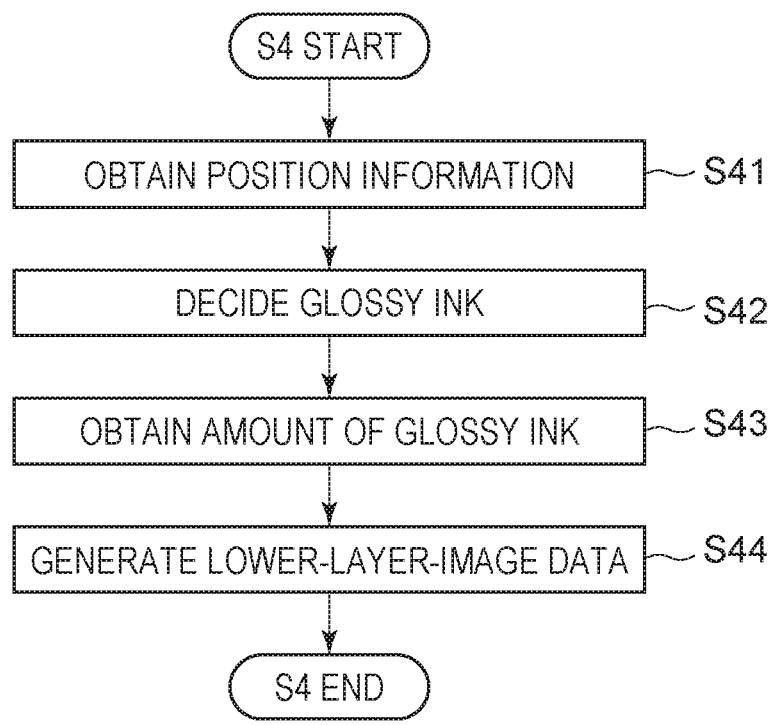
FIG. 13 is a flowchart illustrating processing of generating lower-layer-image data according to the third embodiment.
Figure 14A:
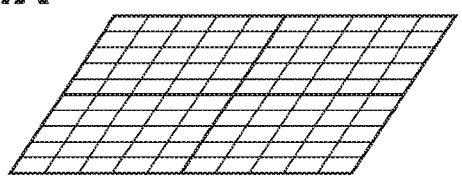
FIGS. 14A through 14E are diagrams illustrating an example of layout information according to a fourth embodiment.
Figure 14D:
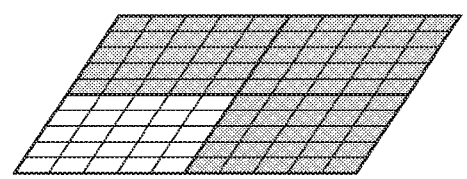
Figure 14B:
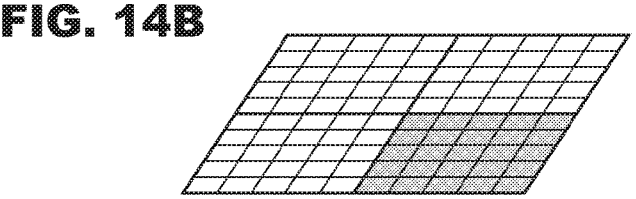
Figure 14E:
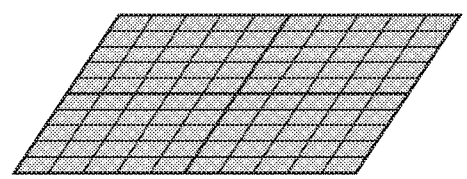
Figure 14C:
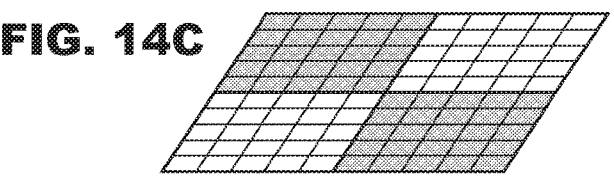

Details of the processing for generating the lower-layer-image data (S40) will be described with reference to FIG. 13. The lower-layer-image data that the lower-layer-image data generating unit generates in the present embodiment is two-channel image data of a predetermined resolution, with each pixel value corresponding to white ink amount and silver ink amount.

In S41, layout information for region A and region B in the smallest control increment region of the color of reflected light is obtained from the data storage unit 206 in the same way as in the first embodiment. In S42A, the glossiness of white ink coating and the glossiness of silver ink coating, stored in the data storage unit 206 beforehand, are compared with the glossiness of the media obtained in S20, and a combination where the difference in glossiness is greatest is selected. From the above-described properties of the glossy inks, there are a total of three combinations that realize a low-glossiness region and high-glossiness region in the present embodiment, which are white ink and silver ink, low-glossiness media and silver ink, and white ink and high-glossiness media. Based on the combination decided in S42A, in S43 the binary image data is converted into image data storing the white ink amount and silver ink amount. Assumption will be made that a table correlating the binary information and ink amount for each combination is recorded in the data storage unit 206, in the same way as in the first embodiment.

In S44, lower-layer-image data is generated by processing the same as in the first embodiment, based on the color image data generated in S30 and the image data storing the ink amounts converted in S43. Specifically, 1200 dpi grayscale image data is generated where each pixel in the 120 dpi color image data has been replaced with the image data converted in S43. The two-channel 1200 dpi image data corresponding to the silver ink amount and white ink amount, generated in this step, is the lower-layer-image data.

As described above, selecting a combination of media to be used and ink that is provided where the difference in glossiness is great enables the color of which sensing is desired when viewing the printed product can be more accurately reproduced. Thus, according to the present embodiment, a lower layer image for controlling diffuse reflection color and spectral reflection color in accordance with media more appropriately can be formed.

Although a form where there are three combinations of white ink and silver ink, low-glossiness media and silver ink, and white ink and high-glossiness media, has been described in the present embodiment, the above example is not restrictive. An arrangement may be made where a matte sheet is used for region B that is a low-glossiness region, and gold ink or a glossy sheet is used for region A that is a high-glossiness region, or the like, as long as the region A and region B illustrated in the first embodiment are realized. A combination may be made such as gold ink and normal white media, for example. In this case, a LUT is preferably used for performing conversion adding in the color that the gold ink has.

Fourth Embodiment

Figure 15:
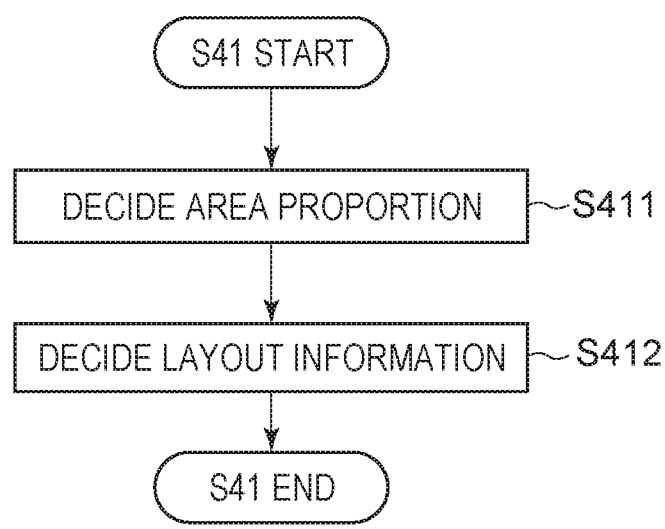
FIG. 15 is a flowchart illustrating processing of obtaining layout information according to the fourth embodiment.

A fixed pattern recorded in the data storage unit 206 beforehand was used in the first embodiment for the layout pattern where two states of layout indicating region A and region B has been recorded. Description will be made in the present embodiment regarding a form where layout patters are adaptively selected based on input information. S41 in the present embodiment at the lower-layer-image data generating unit 2041 differs from the processing described in the above embodiments, so description will be made below primarily regarding contents of this processing. Unlike the first embodiment, the data storage unit 206 holds multiple layout patterns regarding the proportion of area that the region A and region B each occupy in the image to be formed. FIGS. 14A through 14E show example of the multiple layout patterns. Five layout patterns, corresponding to area proportions of 0/4, 1/4, 2/4. 3/4, and 4/4, that the region A and region B can assume illustrated in FIGS. 14A through 14E, are recorded in the data storage unit 206. The processing of obtaining different layout patterns from the data storage unit 206 in accordance with pixel values of the color image data (S41) will be described in detail with reference to FIG. 15.

In S411, the area proportion H regarding region A and region B is decided from 0/4 through 4/4, for each pixel in the color image data. Specifically, an area proportion H that optimizes an object function f(H) in Expression 3 is derived.

$$f(H) = \{(G1/G2) - (H \times Gw/(1-H) \times Gs)\}^2 \qquad \text{(Expression 3)}$$

G1 and G2 are G values of RGB values corresponding to the diffuse reflection color and spectral reflection color respectively, and are handled as being equivalent to luminance values. G1/G2 represents the proportion of the luminance as viewed from the non-spectral reflection direction and the luminance as viewed from the spectral reflection direction as to each other. Gw and Gs are luminesce value of the white ink coated face (region A) in the non-spectral reflection direction, and the luminance value of the silver media sheet face (region B) from the spectral reflection direction. For these luminance values, values that have been measured under predetermined geometric conditions and sorted in the data storage unit 206 beforehand are used. H represents the layout proportion of region A as to region B in a control region for color of reflected light, as described above. (H×Gw/(1−H)×Gs) indicates an estimated value of the proportion of the luminance as viewed from the non-spectral reflection direction and the luminance as viewed from the spectral reflection direction as to each other, when forming a lower layer image using a layout pattern of area proportion H.

In S412, a layout pattern corresponding to the area proportion H decided in S411 is obtained from the data storage unit 206 for each pixel in the color image data. Using this layout pattern enables a lower layer image having a luminance proportion even more similar to the color image data generated in S30 to be formed.

Although a form has been described where the area proportion is decided based on luminance values of the non-spectral reflection direction and the spectral reflection direction, this is not restrictive. For example, an area proportion may be derived where reproduction error of diffuse reflection color and spectral reflection color is smallest, by comparing the gamut of diffuse reflection color and spectral reflection color with the color image data RGB values, in accordance with area proportion. Further a form does not have to have the area proportion being decided based on RGB values of the color image data. For example, a degree of priority in reproduction precision, indicating which color of diffuse reflection color and spectral reflection color is going to be given priority, and the degree of that priority, is input via a UI. A form may be made where, in a case where the degree of priority of the diffuse reflection color is high as compared to the spectral reflection color, a layout pattern is selected where the area proportion of the region A that is the low-glossiness region is high.

As described above, an embodiment has been described where layout patters are adaptively selected based on input information. According to this embodiment, diffuse reflection color and spectral reflection color can be controlled more appropriately.

Fifth Embodiment

Although image data of resolution where the smallest control increment of color of reflected light is equivalent to one pixel has been used as the color image data in the first embodiment, an image with a higher resolution may be used. Description will be made in the present embodiment regarding a method for generating upper-layer-image data where diffuse reflection color and spectral reflection color having a printer resolution of 1200 dpi is input. Note that with regard to the lower-layer-image data, image data is used where the binary pattern illustrated in FIG. 9B is uniformly distributed at printer resolution of 1200 dpi, in the same way as in the first embodiment. Generating of upper-layer-image data (S50) that differs from the above-described embodiments will be primarily described below.

Figure 16:
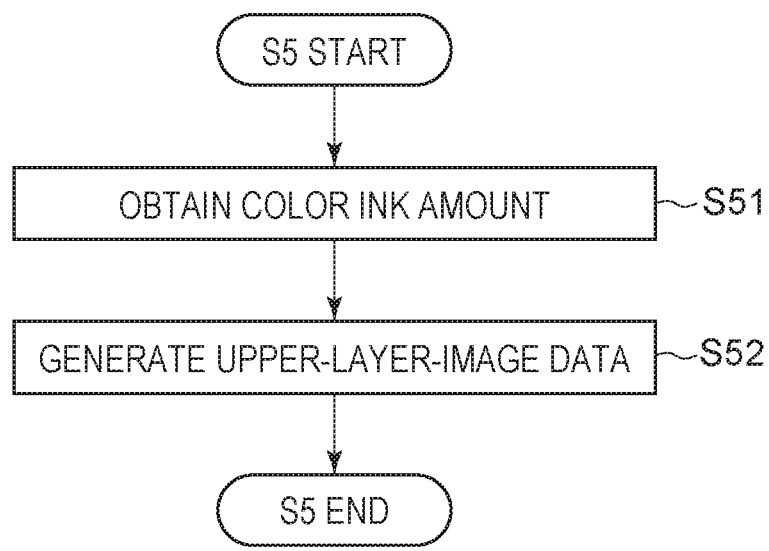
FIG. 16 is a flowchart illustrating processing of generating upper-layer-image data according to a fifth embodiment.

Details of processing for generating upper-layer-image data (S50) will be described with reference to FIG. 16. The upper-layer-image data that the upper-layer-image forming unit 2042 generates is four-channel color image data having resolution of 1200 dpi equivalent to printer resolution, where pixel values corresponding to the amount of CMYK ink for each pixel are stored, in the same way as in the first embodiment.

In S51, a color separation LUT correlating the RGB values of the color image data and the amount of CMYK ink is obtained from the data storage unit 206, and the amount of color ink for each pixel of the color image data is decided by referencing the LUT. Note that unlike the first embodiment, the color image data has printer resolution of 1200 dpi in the present embodiment. Accordingly, the CMYK ink amount corresponding to diffuse reflection color and spectral reflection color is decided for each pixel of the lower-layer-image data. In S52, the upper-layer-image data is generated based on the CMYK ink amount obtained in S51 and the lower-layer-image data generated in S40. Specifically, one of CMYK ink amount corresponding to diffuse reflection color or CMYK ink amount corresponding to spectral reflection color is selected based on whether a pixel of the same coordinates in the lower-layer-image data is region A or region B. That is to say, in a case where the pixel value of lower-layer-image data (white ink amount) corresponding to each pixel is 100, the CMYK ink amount corresponding to the diffuse reflection color decided in S51 is selected, and if 0, the CMYK ink amount corresponding to the spectral reflection color decided in S51 is selected. The selected CMYK ink amount is stored as pixel values in the upper-layer-image data.

As described above, a form has been described where the image processing apparatus 1 according to the present embodiment uses color image data having a resolution of the same level as the printer resolution as upper-layer-image data.

Sixth Embodiment

Description has been made in the first embodiment regarding data generating and image forming processing, by way of a form having a functional configuration separated into upper layer image and lower layer image. In the present embodiment, input color information indicating the diffuse reflection color is converted into a layered structure of ink for expressing the diffuse reflection color, and input color information indicating the spectral reflection color is converted into a layered structure of ink for expressing the spectral reflection color. Thereafter, the layout of the layered structures is decided, and image forming is performed; such a form will be described. Note that processing different from the above-described embodiments will be primarily described in the present embodiment.

Figure 17:
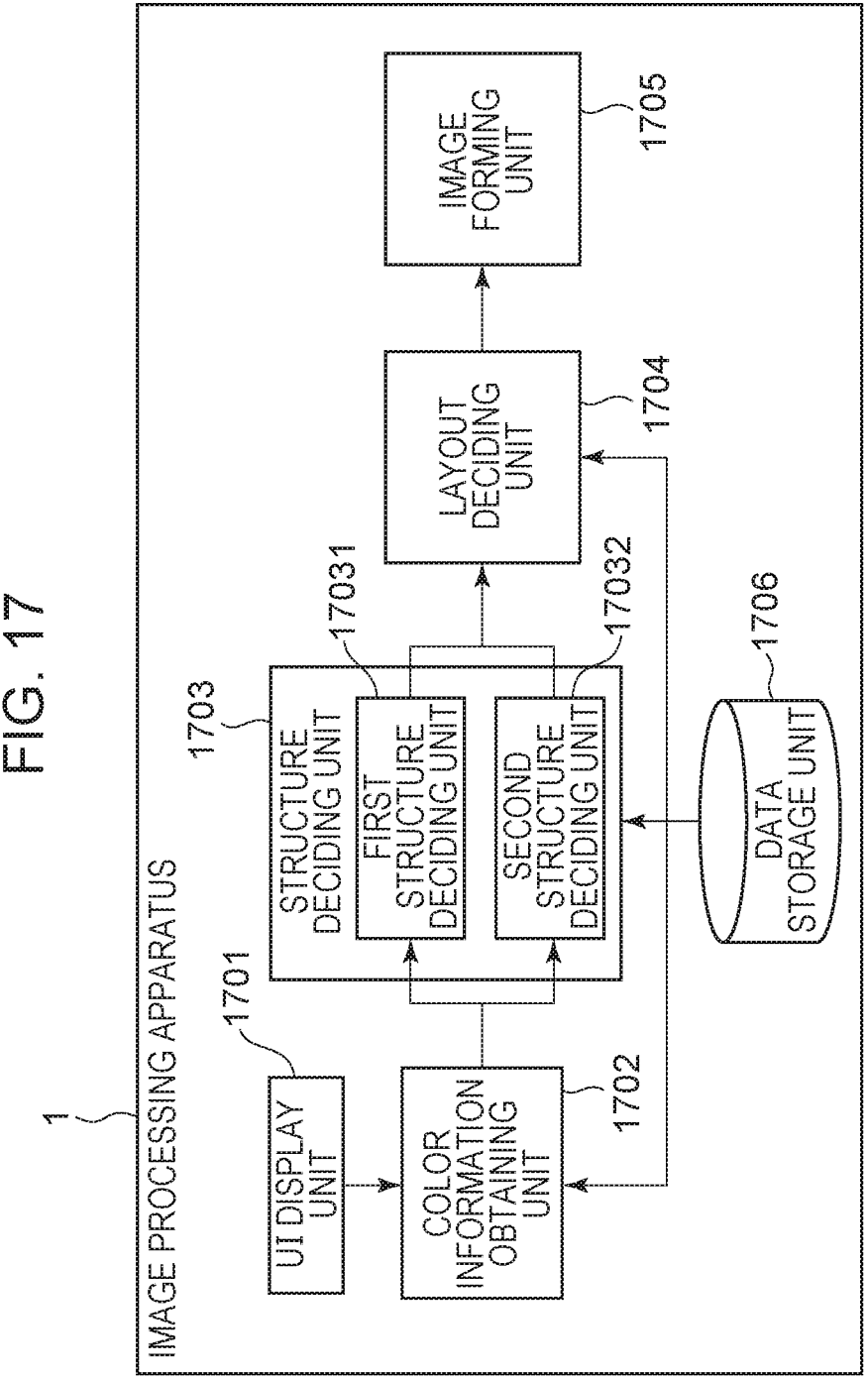
FIG. 17 is a block diagram illustrating a functional configuration of an image processing apparatus 1 according to a sixth embodiment.

FIG. 17 is a block diagram illustrating the functional configuration of the image processing apparatus 1 according to the present embodiment. The contents of processing that an image processing application according to the present embodiment executes based on commands from the CPU 101 will be described with reference to FIG. 17. The image processing apparatus 1 includes a UI display unit 1701, a color information obtaining unit 1702, a structure deciding unit 1703 made up of a first structure deciding unit 17031 and a second structure deciding unit 17032, a layout deciding unit 1704, an image forming unit 1705, and a data storage unit 1706. The UI display unit 1701 is realized by the display 15, and displays a GUI for accepting input from the user and so forth on the display 15. This sort of a UI display unit 1701 functions as an input accepting unit that accepts input of data including color information such as diffuse reflection color and spectral reflection color. The color information obtaining unit 1702 obtains input image data of which input has been accepted. The first structure deciding unit 17031 decides a layered structure of ink for reproducing the obtained diffuse reflection color on a recording medium. The second structure deciding unit 17032 decides a layered structure of ink for reproducing the obtained spectral reflection color on the recording medium. The layout deciding unit 1704 decides the layout of two layered structures indicating each of the spectral reflection color and diffuse reflection color. The image forming unit 1705 forms an image on the recording medium by the printer 14, based on the layered structure and the layout information thereof. The data storage unit 1706 holds information, such as property values of the inks provided to the printer 14, beforehand. Detailed control operations of each part will be described later.

Figure 18:
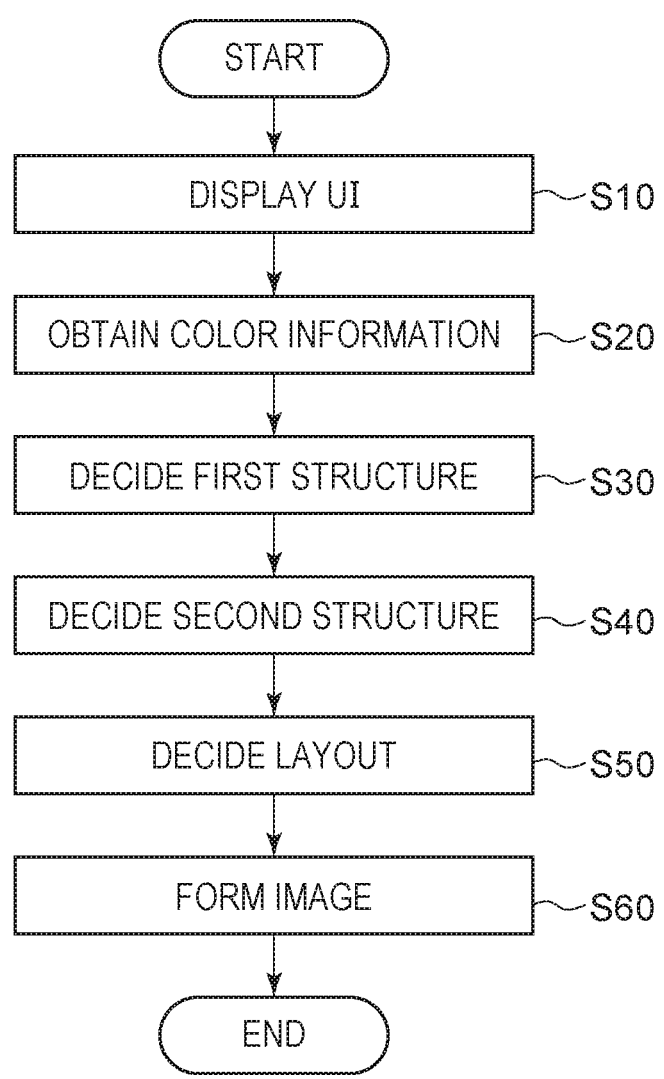
FIG. 18 is a flowchart illustrating processing of the image processing apparatus 1 according to the sixth embodiment.

FIG. 18 is a flowchart illustrating processing contents of the image processing apparatus 1 according to the present embodiment. The contents of processing by the image processing apparatus 1 according to the present embodiment will be described in detail below with reference to FIG. 18. Note that the processing in the flowchart shown in FIG. 18 is executed by the CPU 101, program code stored in the ROM 102 having been loaded to the RAM 103. The flowchart shown in FIG. 18 is started by a user inputting an instruction by operating the input device 13 and the CPU 101 accepting the input instruction.

In S10, the UI display unit 1701 displays on the display 15 a UI prompting the user to input necessary information, in order to accept input of information necessary for the image processing apparatus 1. In the present embodiment, the UI illustrated in FIG. 8 is displayed in the same way as in the first embodiment, the path and filename of an image data file storing color information for each pixel is instructed by input to the input region 801 by the user, and then next, upon the output button 802 being pressed, the flow advances to S20. In S20, input image data that stores the color information indicating the diffuse reflection color and spectral reflection color, instructed by the user in S10, is obtained from the data storage unit 1706. Note that the color information indicating the diffuse reflection color is used to decide the layered structure for ink to control diffuse reflection color in S30A, and the color information indicating the spectral reflection color is used to decide the layered structure for ink to control spectral reflection color in S40A. Note that the later-described S30A and S40A may be processed in a different order, or the processing may be performed in parallel.

In S30A, the first structure deciding unit 17031 generates information necessary to form a layered structure of ink reproducing the diffuse reflection color obtained in S20. This information hereinafter is first structure data. Note that the layered structure to be formed is equivalent to the layered structure of region A illustrated in FIGS. 4A and 4B, that has been described in the first embodiment. The first structure data indicates the white ink amount, color ink amount, and order of recording each ink onto the recording medium, in order to form the layered structure at the printer 14. Detailed control operations for generating the first structure data will be described below. First, the RGB values of the diffuse reflection color are obtained from the input image data obtained in S20. Next, a LUT where the ink amounts and recording order and the RGB values of diffuse reflection color are correlated is referenced at the data storage unit 1706. FIG. 19A illustrates an example of the data format of the LUT. As described above, the glossy ink and color ink amounts corresponding to the RGB values of the diffuse reflection color, and the order of recording the inks, are described. In the example illustrated in the drawing, the ink recording order records the order of glossy ink and color ink, with a case where the glossy ink is laid down first as 1, and a case where the color ink is laid down first as 0. Finally, the LUT is referenced to derive the layered structure for reproducing the diffuse reflection color, i.e., the CMYKW ink amounts and the order of recording these inks, which is the first structure data.

In S40A, the second structure deciding unit 17032 generates information necessary to form a layered structure of ink reproducing the spectral reflection color obtained in S20, in the same way as in S30A. This information hereinafter is second structure data. Note that the layered structure to be formed is equivalent to the layered structure of region B illustrated in FIGS. 4A and 4B, that has been described in the first embodiment. The second structure data indicates the white ink amount, color ink amount, and order of recording each ink onto the recording medium, in order to form the layered structure at the printer 14. Detailed control operations for generating the second structure data will be described below. First, the RGB values of the spectral reflection color are obtained from the input image data obtained in S20. Next, a LUT where the ink amounts and recording order and the RGB values of spectral reflection color are correlated is referenced at the data storage unit 1706. FIG. 19B illustrates an example of the data format of the LUT. As described above, the glossy ink and color ink amounts corresponding to the RGB values of the spectral reflection color, and the order of recording the inks, are described. In the example illustrated in the drawing, the ink recording order records the order of glossy ink and color ink, with a case where the glossy ink is laid down first as 1, and a case where the color ink is laid down first as 0. Finally, the LUT is referenced to derive the layered structure for reproducing the spectral reflection color, i.e., the CMYKW ink amounts and the order of recording these inks, which is the second structure data. Note that the structure data may differ in accordance with preset conditions. Although only the recording order of color ink and glossy ink was held in the above-described embodiments, but a form may be made where the recording order for all of 1 through 5 is held regarding the five inks of C, M, Y, K, and W, for example. In a case where the recording order of the CMYK ink and W ink are preset at the image forming unit 1705, a form may be made where only the amounts of CMYKW ink is decided as the structure data.

In S50A, the layout deciding unit 1704 decides the layout of the layered structures decided in S30A and S40A in the control increment region of color of reflected light. This information of layout is recorded in the data storage unit 1706, in the same way as in the first embodiment. Note, however, that this may be adaptively decided by input information, as described in the fourth embodiment. Hereinafter, data where the structure data generated in S30A and S40A is laid out in S50A is layout data. In S60A, the image forming unit 1705 forms the layered structures decided in S30A and S40A on the recording medium, following the layout data generated in S50A.

As described above, according to the present embodiment, a layered structure of ink the same as in the first embodiment can be formed by a functional configuration different from the first embodiment.

Seventh Embodiment

In the first embodiment, a form has been described where upper-layer-image data and lower-layer-image data are generated, and an image is formed by the printer 14 based on this image data. In the present embodiment, a form will be described where an image, with controlled diffuse reflection color and spectral reflection color, is projected on a screen by a projector. Note that points that differ from the above-described embodiments will be primarily described in the present embodiment.

Figure 20:
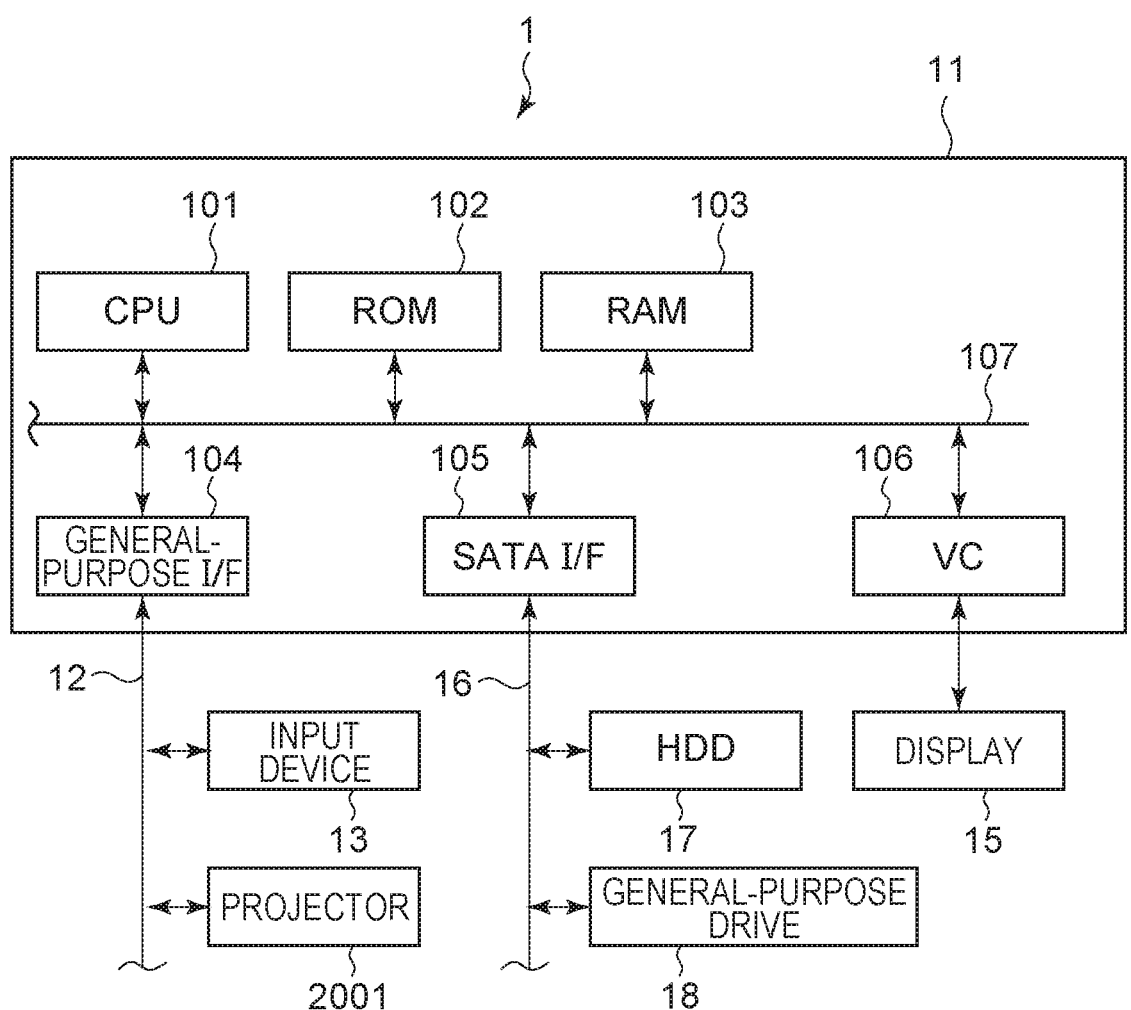
FIG. 20 is a block diagram illustrating the hardware configuration of an image projection system 20 according to a seventh embodiment.

FIG. 20 is a hardware configuration example of an image projection system 20 according to the present embodiment. The image projection system 20 has a projector 2001 connected instead of the printer 14, unlike the image processing apparatus 1 described in the first embodiment. The projector 2001 has an imaging apparatus for imaging a projected image built in. Other parts are the same as in the first embodiment, and accordingly description will be omitted.

FIG. 21 is a block diagram illustrating the functional configuration of the image projection system 20 according to the present embodiment. The contents of processing that an image processing application according to the present embodiment executes based on commands from the CPU 101 will be described with reference to FIG. 21.

The image projection system 20 includes a UI display unit 2101, a color information obtaining unit 2102, a lower-layer-image data generating unit 2103, an upper-layer-image data generating unit 2104, an image projecting unit 2105, and a data storage unit 2106, further the lower-layer-image data generating unit 2103 is made up of a test pattern projecting unit 21031, a imaging unit 21032, a detecting unit 21033, and a mask data generating unit 21034, and the upper-layer-image data generating unit 2104 is made up of a projection image generating unit 21041. The UI display unit 2101 is realized by the display 15 and displays a GUI or the like for accepting input from the user on the display 15. This sort of UI display unit 2101 functions as an input accepting unit to accept input of data including color information such as diffuse reflection color and spectral reflection color. The color information obtaining unit 2102 obtains data indicating the color information of which input has been accepted. The test pattern projecting unit 21031 projects an image including a known marker on the screen. Note that region A and region B coexist on the screen, and have the same properties as the lower layer image formed in the first embodiment. The screen also includes a known marker the same as a test pattern. The imaging unit 21032 images the screen and the test pattern projected onto the screen. The detecting unit 21033 detects the marker included in the screen and the marker included in the projected test pattern, from the imaged image. The mask data generating unit 21034 generates mask data indicating which of the two regions coexisting on the screen that the projection destination of each pixel in the projected image corresponds to. The projection image generating unit 21041 generates a projection image based on the data obtained at the color information obtaining unit 2102 and the mask data generated at the mask data generating unit 21034. The image projecting unit 2105 projects the projection image generated at the projection image generating unit 21041 onto the screen. The data storage unit 2106 holds information, such as screen properties and so forth, beforehand. These screen properties indicate layout information of the aforementioned two regions coexisting on the screen. Detailed control operations of each part will be described later.

Figure 22A:
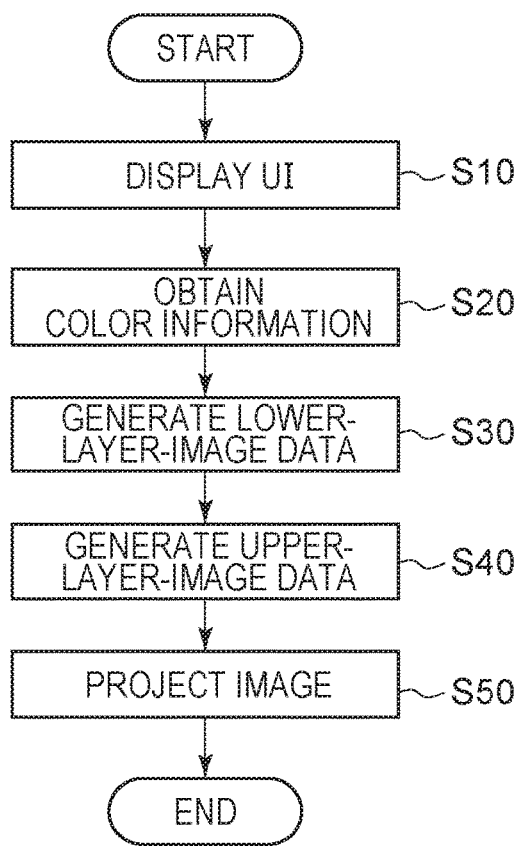
FIGS. 22A and 22B are flowcharts illustrating the contents of processing by the image projection system 20 according to the seventh embodiment.
Figure 22B:
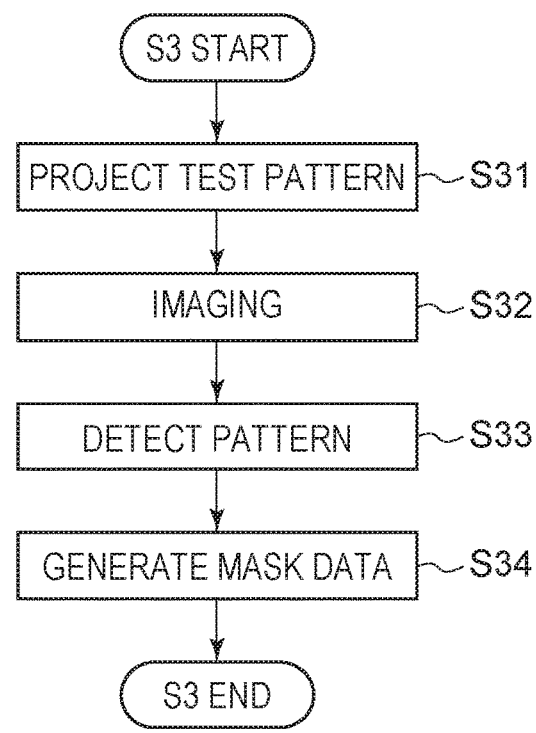

FIGS. 22A and 22B are flowcharts illustrating the contents of processing by the image projection system 20 according to the present embodiment. The contents of processing by the image projection system 20 according to the present embodiment will be described in detail below with reference to FIGS. 22A and 22B. Note that the processing in the flowcharts shown in FIGS. 22A and 22B is executed by the CPU 101, program code stored in the ROM 102 having been loaded to the RAM 103. The flowcharts shown in FIGS. 22A and 22B are started by a user inputting an instruction by operating the input device 13 and the CPU 101 accepting the input instruction.

In S10, the UI display unit 2101 displays on the display 15 a UI prompting the user to input necessary information, in order to accept input of information necessary for the image projection system 20. In the present embodiment, the UI illustrated in FIG. 8 is displayed in the same way as in the first embodiment, the path and filename of an image data file storing color information for each pixel is instructed by input by the user, and then next, upon the output button 802 being pressed, the flow advances to S20. In S20, input image data that stores the color information indicating the diffuse reflection color and spectral reflection color, instructed by the user in S10, is obtained from the data storage unit 2106.

In S2230, the lower-layer-image data generating unit 2103 generates lower-layer-image data. This lower-layer-image data means mask data indicating which of the two regions coexisting on the screen that the projection destination of each pixel of the image corresponds to. Details of these processing operations will be described later. In S2240, the upper-layer-image data generating unit 2104 generates three-channel color image data where RGB values are stored in each pixel, based on the lower-layer-image data and the input image data. This color image data is generated by referencing the above-described lower-layer-image data, and selecting RGB values representing diffuse reflection color and RGB values representing spectral reflection color included in the input image data. In S2250, the image projecting unit 2105 projects an image indicated by the upper-layer-image data generated in S2240 on the screen.

Next, the details of processing of generating lower-layer-image data (S2230) will be described with reference to FIG. 22B. The lower-layer-image data that the lower-layer-image data generating unit 2103 generates in the present embodiment means mask data indicating which of the two regions coexisting on the screen that each pixel in the image corresponds to. This mask data is binary image data where binary values distinguishing two regions is stored in each pixel.

Figure 23:
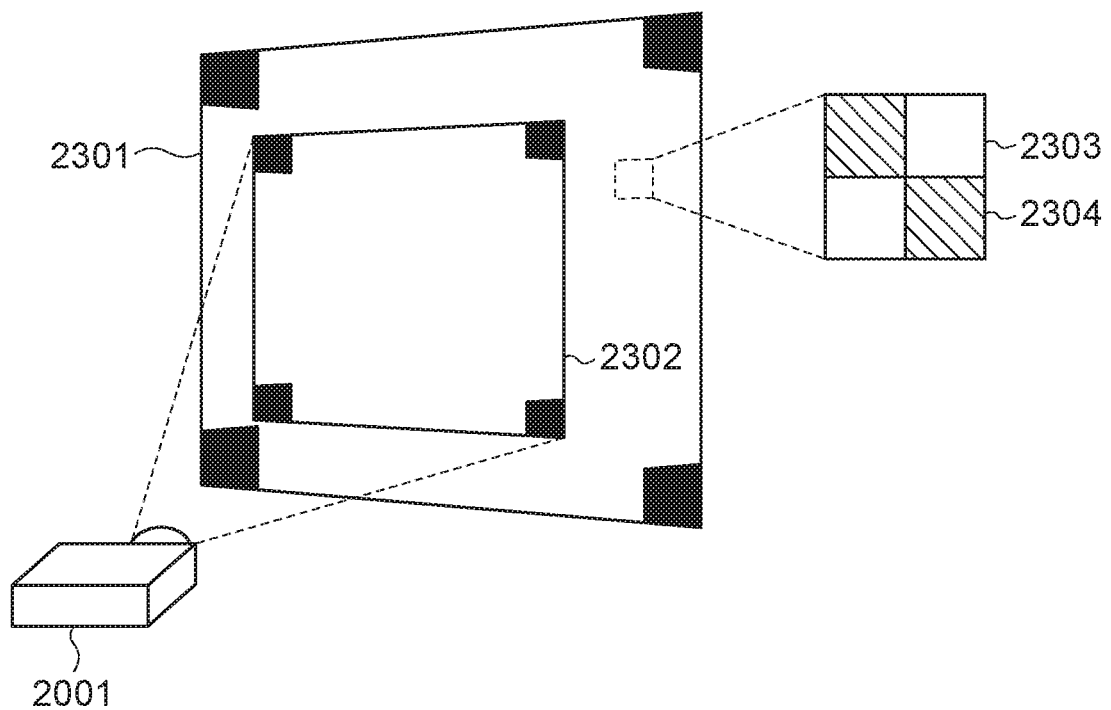
FIG. 23 is a schematic diagram for describing the positional relation between a projected image from the image projection system 20 according to the seventh embodiment and a screen.

In S31, the test pattern projecting unit 21031 projects a predetermined test pattern. FIG. 23 is a schematic diagram for describing the relation between a screen 2301, the projector 2001, and a projection region 2302. The test pattern according to the present embodiment is an image where a marker detectable in later-described processing is disposed, and specifically, means an image where black rectangles are disposed at the four corners, such as indicated in the projection region 2302 in FIG. 23. Also disposed on the screen is a low-glossiness region 2303 and a high-glossiness region 2304, respectively corresponding to the region A and region B described in the first embodiment, as described above. In S32, the imaging unit 21032 images the screen where the test patter has been projected. Note that the imaging unit is built in to the projector 2001, as described above.

In S33, the detecting unit 21033 detects the markers included in the screen and the markers included in the projected test pattern. Specifically, the imaged image is binarized using a predetermined threshold value, and performs labeling of connected regions. Next, end points of four labels where the distances from the four corners of the imaged image are the smallest are found, and the coordinates thereof are taken as coordinates of the detected four corners of the screen. With the four labels above excluded, end points of four labels where the distances from the four corners of the image are the smallest are found, and the coordinates thereof are taken as coordinates of the detected projection region. Other than this, the projected test pattern and detection method can be realized using known pattern matching and so forth.

In S34, the mask data generating unit 21034 generates mask data, based on the coordinates detected in S33, and screen properties held in the data storage unit 2106. Screen properties are layout information of the low-glossiness regions and high-glossiness regions in the frame surrounded by markers, and correlation between each pixel of the image and the two regions coexisting in the screen can be performed by positioning with the coordinates detected in S33 as references.

As described above, according to the present embodiment, an image with controlled diffuse reflection color and spectral reflection color can be projected on a screen by a projector.

Eighth Embodiment

In the first embodiment two regions with different reflection properties of light were laid out as a lower layer image, but the reflection properties do not need to be restricted to two. In the present embodiment, a form where three regions with different reflection properties of light are laid out as a lower layer image will be described. In the same way as with the first embodiment, color information is laid out in the upper layer image based on the lower layer image. According to the present embodiment, colors can each be controlled under three geometric conditions. That is to say, one more type of color in addition to the above-described diffuse reflection color and spectral reflection color can be seen depending on the direction. This is the same in a case of controlling color under four or more geometric conditions. The functional configuration of the image processing apparatus 1 according to the present embodiment is the same as that in the first embodiment. Description will be primarily made in the present embodiment regarding processing that differs from the above-described embodiments.

Figure 4B:
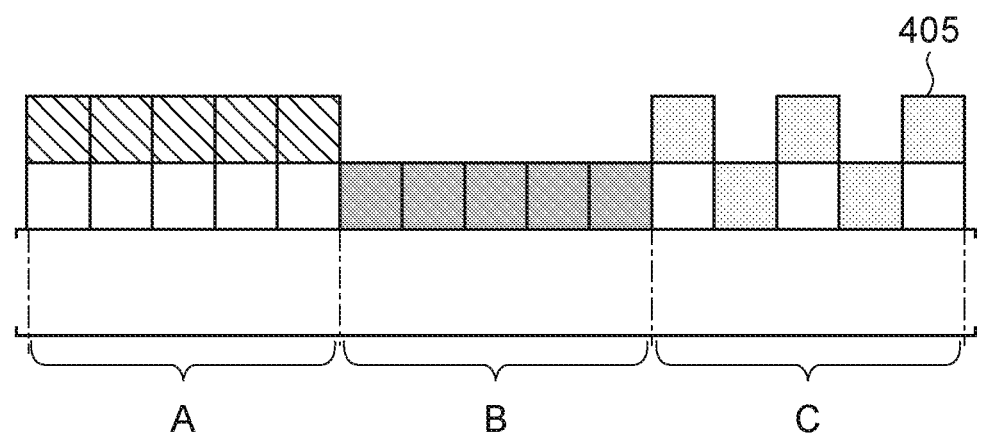

FIG. 4B illustrates a schematic view of a cross-section of a printed product formed by later-described processing contents at the image processing apparatus 1 according to the present embodiment. In the present embodiment, a printed product where, in addition to the region A and region B described in the first embodiment, a region C coexists. The region C is a region where part of the region is coated with white ink, and color ink is coated thereupon. Hereinafter, description will be made with the upper layer color ink 405 in the region C as being green. FIGS. 6B through 6E are diagrams schematically illustrating the intensity of reflected light in the region C. the dotted line in the drawings indicates the reflection intensity for each angle in the region C, in the same way as in FIG. 6A, and the reflection properties of this light can be estimated by weighted average of reflection intensity of incident light at region A and region B. It can be seen from FIGS. 6C through 6E, that when observing reflection light of a macro region in which the three regions including the region C are disposed, the regions corresponding to reflected light contributing most to reflection intensity differ depending on geometric conditions. For example, in a case where the difference between the incident angle of light and the observation angle Or is greatest, as illustrated in the drawings, the reflection light that has the greatest contribution to reflection intensity in FIG. 6C is the reflection light from region A, so a tinge close to yellow, which is the reflected color at the region A, can be observed. Also, in a case of observing from around the spectral reflection direction where the difference between the incident angle of light and the observation angle Or is smallest, the reflection light that has the greatest contribution to reflection intensity in FIG. 6D is the reflection light from region B, so a tinge close to cyan, which is the reflected color at the region B, can be observed. In the same way, under the conditions illustrated in FIG. 6E, the reflection light that has the greatest contribution to reflection intensity is the reflection light from region C, so a tinge close to green, which is the reflected color at the region C, can be observed. Note that it is sufficient for reflection properties of light to have different regions where the contribution to reflection intensity is greatest under the geometric conditions. The contents of the series of processing by the image processing apparatus 1 to form the printed product illustrated in FIG. 4B will be described below.

In S10, the UI display unit 201 displays a UI to the user, and the user inputs instruction of information relating to input image data, in the same way as in the first embodiment. In the present embodiment, the input image data is data of three RGB images imaged under three geometric conditions, unlike the first embodiment. The RGB values are obtained by shooting under geometric conditions where the light source position is such as illustrated in FIG. 24C, for example, in addition to the geometric conditions described with reference to FIGS. 24A and 24B. Specifically, with the angle θI of the imaging apparatus as 45 degrees, and the light source angle θi in FIG. 24A as 45 degrees and the light source angle θi in FIG. 24B as 0 degrees, the light source angle θi in FIG. 24C is set to be 22.5 degrees, which is between the two aforementioned angles. These geometric conditions are examples, so the angles may be different values, and the position of the imaging apparatus may be changed as described above. When the output button 802 is pressed after input of instruction for information relating to input image data, the flow advances to S20.

In S20, the above-described three input image data corresponding to the information instructed by the user via the UI in S10 are obtained from the data storage unit 206. In S30, the color image data generating unit 203 takes the RGB values of the three input image data obtained in S20 as the diffuse reflection color, spectral reflection color, and third color, respectively, and stores these RGB values as layer pixel values in a single image file. Thus, color image data that is nine-channel image data is generated.

In S40, lower-layer-image data generating unit 2041 generates grayscale image data where white ink amount has been stored in each pixel. The lower-layer-image data means layout information of light reflection properties of the three of a mid-glossiness region (region C) in addition to the low-glossiness region (region A) and high-glossiness region (region B). Detailed control operations in S40 will be described below. First, layout information of regions in a smallest control increment region of color of reflected light is obtained from the data storage unit 206. The layout information is a ternary pattern where three different states of glossiness properties are recorded. Next, the white ink amount is decided in according to the three values indicating the reflection properties of light. For example, the white ink amount of region A, region B, and region C are respectively set to 100, 0, and 50%, for example. Finally, grayscale image data is generated by the processing described in S43 in the first embodiment. This grayscale image data is taken as the lower-layer-image data.

In S50, the upper-layer-image data generating unit 2042 generates color image data where color ink amounts are stored in each pixel, based on the lower-layer-image data and the input image data. Detailed control operations in S50 will be described below. First, CMYK values are each calculated from the RGB values, by processing described in S51 in the first embodiment. Next, CMYK values corresponding to the reflection properties of light indicated in the lower-layer-image data are selected and laid out, thereby generating color image data. In the present embodiment three regions of region A, region B, and region C are laid out in the lower-layer-image data as described above, and the CMYK values calculated from the RGB values obtained under the geometric conditions illustrated in FIG. 24A are laid out in the region B. In the same way, the CMYK values calculated from the RGB values obtained under the geometric conditions illustrated in FIG. 25B and FIG. 25C are laid out in region A and region C, respectively.

In S60, the lower-layer-image forming unit 2051 executes lower layer image forming operations by the above-described printer 14, based on the lower-layer-image data. In S70, the upper-layer-image forming unit 2052 executes upper layer image forming operations by the above-described printer 14, based on the upper-layer-image data.

As described above, control can be performed regarding each viewing of different colors under multiple geometric conditions, without being restricted to the two conditions of non-spectral reflection direction and spectral reflection direction of incident light.

Other Embodiments

Although an example has been illustrated in the above embodiments where color image data is generated from two input image data, and used to generate lower-layer-image data and upper-layer-image data, the method of generating the lower-layer-image data and upper-layer-image data is not restricted to the above example. for example, a form may be made where the color image data generating step is not performed, and the lower-layer-image data and upper-layer-image data are directly generated from the two input image data. In this case, One of the two input image data is used for resolution conversion at the time of generating the lower-layer-image data. In the generating of the upper-layer-image data, RGB values of input image data indicating diffuse reflection color that have been converted into CMYK ink amounts are stored in pixels of the same coordinates as in the region A. RGB values of input image data indicating spectral reflection color that have been converted into CMYK ink amounts are stored in pixels of the same coordinates as in the region B.

Also, although a method for deriving the amount of ink using a predetermined LUT recorded in the data storage unit beforehand has been described in the above embodiments, the method for deriving the amount of ink is not restricted to this. For example, this may be derived using a predetermined mathematical expression instead of a LUT. Further, a form may be made where multiple LUTs are recorded in the data storage unit beforehand, and the LUT to be used for the processing is selected based on information accepted via a UI.

Also, although predetermined values were used for the smallest control increment of color of reflected light and the smallest control increment of reflection properties in the above embodiments, a form may be made where this control unit can be optionally specified by the user via a UI.

Also, although processing where control of diffuse reflection color and spectral reflection color is applied to the entire printing region has been described in the above embodiments, a form may be made where this is partially applied. For example, generating or externally obtaining a mask image that distinguishes between regions to apply control of diffuse reflection color and spectral reflection color, and regions to control only diffuse reflection color, enables switching between the processing described in the above embodiments and normal printing processing, by each region.

Also, although the resolution of the input image data was predetermined based on resolution according to printer properties, known resolution conversion processing may be used to handle image data of an optional resolution as the input image data.

Also, although a form has been described in the above embodiments where lower-layer-image data in which regions having different light reflection properties are laid out is generated, upper-layer-image data in which color information is laid out in accordance with the lower layer image is generated, so the lower layer image and upper layer image are formed, this is not restricted to two layers. For example, clear ink may be formed to a uniform film thickness upon the lower layer image and upper layer image formed in the above embodiments or the like, thereby forming a layered structure having multiple layers of two layer or more.

Also, while an example has been illustrated in the above embodiments of an image forming unit employing the ink-jet method, this may be other recording methods, such as electrophotography or the like.

Also, description has been made in the above embodiments that the shape of regions that control increments of light reflection properties or color of reflected light is rectangular, having the same number of pixels vertically and laterally, but this is not restrictive. For example, a rectangle may be used where the number of pixels vertically and laterally are not the same, and shapes formed as other polygons may be used.

The present invention may be realized by processing where a program realizing one or more functions of the above-described embodiments is supplied to a system or apparatus via a network or recording medium, and one or more processors in a computer of the system or apparatus reads out and executes the program. This may also be realized by a circuit that realizes one or more functions (e.g., an ASIC).

According to the present invention, visual effects, where different colors are seen depending on the angle of viewing, can be easily imparted to an image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus that generates image data for generating an image by overlaying a second image upon a first image, the image processing apparatus comprising:
a first obtaining unit configured to obtain color information including a first color and a second color that differs from the first color;
a deciding unit configured to decide an area proportion of a first region to a second region regarding an area occupied in the first image, based on the first color and the second color;
a second obtaining unit configured to obtain first image data indicating the first image, based on the area proportion; and a first generating unit configured to generate second image data for generating the second image, where the first color is laid out in the first region and the second color is laid out in the second region, based on the color information and the first image data, wherein the second obtaining unit obtains the first image data, in which a proportion of reflection intensity of incident light at the first region to reflection intensity of incident light at the second region in a first direction out of reflection directions of the incident light is different from the proportion in a second direction out of reflection directions of the incident light that is different from the first direction.

2. The image processing apparatus according to claim 1, wherein the second region is a region where the reflection intensity of the incident light in a spectral reflection direction of the incident light is greater than in the first region, and the reflection intensity of the incident light in a non-spectral reflection direction of the incident light is smaller than in the first region.

3. The image processing apparatus according to claim 1, wherein at least one of the first color and the second color is reproduced by color mixing.

4. The image processing apparatus according to claim 1, further comprising:
a first input unit configured to input of input image data, and color correction information for correcting color indicated by the input image data; and
a second generating unit configured to generate the color information based on the input image data and the color correction information,
wherein the first obtaining unit obtains the color information generated by the second generating unit.

5. The image processing apparatus according to claim 2, wherein the color information further includes at least one type of color that is different from the first color and the second color,
wherein the first generating unit generates the second image data by laying out the at least one type of color in at least one type of region,
wherein the reflection intensity of the incident light in the non-spectral reflection direction of the incident light is smaller than the reflection intensity of the incident light in the first region, and is greater than the reflection intensity of the incident light in the second region, and the reflection intensity of the incident light in the spectral reflection direction of the incident light is greater than the reflection intensity of the incident light in the first region, and is smaller than the reflection intensity of the incident light in the second region.

6. The image processing apparatus according to claim 1, wherein the first color has a different hue from the second color.

7. The image processing apparatus according to claim 1, further comprising:
a second input unit configured to input a degree of priority indicating which of the first color and the second color to reproduce with priority,
wherein the deciding unit decides the area proportion based on the degree of priority.

8. The image processing apparatus according to claim 1, further comprising:
a forming unit configured to form the first image and the second image on a recording medium, based on the first image data and the second image data.

9. The image processing apparatus according to claim 8, wherein the forming unit forms the first image by recording white ink on silver media, and forms the second image by recording color ink on the silver media or on the recorded white ink.

10. The image processing apparatus according to claim 8, wherein the forming unit forms the first image by recording silver ink on white media, and forms the second image by recording color ink on the white media or on the recorded silver ink.

11. The image processing apparatus according to claim 1, further comprising:
a projecting unit configured to project the second image on a screen on which the first image has been formed, based on the second image data.

12. An image processing method of generating image data for generating an image by overlaying a second image upon a first image, the image processing method comprising:
a first obtaining step of obtaining color information including a first color and a second color that differs from the first color;
a deciding step of deciding an area proportion of a first region to a second region regarding an area occupied in the first image, based on the first color and the second color;
a second obtaining step of obtaining first image data indicating the first image, based on the area proportion; and
a first generating step of generating second image data for generating the second image, where the first color is laid out in the first region and the second color is laid out in the second region, based on the color information and the first image data,
wherein, in the second obtaining step, the first image data is obtained, in which a proportion of reflection intensity of incident light at the first region to reflection intensity of incident light at the second region in a first direction out of reflection directions of the incident light is different from the proportion in a second direction out of reflection directions of the incident light that is different from the first direction.

13. A non-transitory computer-readable storage medium storing instructions that, when executed by a computer, cause the computer to perform an image processing method of generating image data for generating an image by overlaying a second image upon a first image, the image processing method comprising:
a first obtaining step of obtaining color information including a first color and a second color that differs from the first color;
a deciding step of deciding an area proportion of a first region to a second region regarding an area occupied in the first image, based on the first color and the second color;
a second obtaining step of obtaining first image data indicating the first image, based on the area proportion; and
a first generating step of generating second image data for generating the second image, where the first color is laid out in the first region and the second color is laid out in the second region, based on the color information and the first image data,
wherein, in the second obtaining step, the first image data is obtained, in which a proportion of reflection intensity of incident light at the first region to reflection intensity of incident light at the second region in a first direction out of reflection directions of the incident light is different from the proportion in a second direction out of reflection directions of the incident light that is different from the first direction.

\* \* \* \* \*